United States Patent
Seidel et al.

(10) Patent No.: US 12,052,106 B2
(45) Date of Patent: Jul. 30, 2024

(54) LOW LATENCY HARQ PROTOCOL FOR URLLC SERVICES

(71) Applicant: KONINKLIJKE PHILIPS N.V., Eindhoven (NL)

(72) Inventors: Eiko Seidel, Sauerlach (DE); Baris Goektepe, Berlin (DE); Cornelius Hellge, Berlin (DE); Thomas Wirth, Berlin (DE); Thomas Schierl, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 682 days.

(21) Appl. No.: 17/169,883

(22) Filed: Feb. 8, 2021

(65) Prior Publication Data

US 2021/0167897 A1  Jun. 3, 2021

Related U.S. Application Data

(63) Continuation of application No. PCT/EP2019/071255, filed on Aug. 7, 2019.

(30) Foreign Application Priority Data

Aug. 9, 2018  (EP) .................................. 18188369

(51) Int. Cl.
*H04L 1/1812*  (2023.01)
*H04L 1/1803*  (2023.01)
(Continued)

(52) U.S. Cl.
CPC .......... *H04L 1/1816* (2013.01); *H04L 1/1803* (2013.01); *H04L 1/1864* (2013.01);
(Continued)

(58) Field of Classification Search
None
See application file for complete search history.

(56) References Cited

U.S. PATENT DOCUMENTS

| 10,785,791 B1* | 9/2020 | Eyuboglu ............. H04L 1/1887 |
| 2007/0081492 A1* | 4/2007 | Petrovic ................ H04L 1/1812 370/331 |

(Continued)

FOREIGN PATENT DOCUMENTS

| JP | 2017011588 A | 1/2017 |
| JP | 2018098802 A | 1/2018 |

(Continued)

OTHER PUBLICATIONS

Samsung, "HARQ Management and Feedback", 3GPP Draft; R1-1716005, 3rd Generation Partnership Project (3GPP), Mobile Competence Centre, vol. RAN WG1, No. 3, Nagoya, Japan; Sep. 18, 2017-Sep. 21, 2017, Sep. 17, 2017, Retrieved from the Internet: URL: https://www.3gpp.org/ftp/TSG_RAN/WG1_RL1/TSGR1_AH/NR_AH_1709/Docs/.

(Continued)

*Primary Examiner* — Adnan Baig

(57) ABSTRACT

In the field of mobile communication systems, techniques relating to checking or verifying if information sent by a transmitter has been correctly received at a receiver so as to initiate a retransmission in case of a non-successful transmission of the information are described. Embodiments relate to simultaneous synchronous and asynchronous HARQ, hybrid automatic repeat request, operations in a network entity of the wireless communication system, like a base station or a user equipment, UE. In particular, an approach for reliably handling retransmissions in a wireless communication system for data or information associated with different services types is described.

25 Claims, 13 Drawing Sheets

(51) Int. Cl.
*H04L 1/1829* (2023.01)
*H04L 1/1867* (2023.01)
*H04L 5/00* (2006.01)

(52) U.S. Cl.
CPC .......... *H04L 1/1887* (2013.01); *H04L 1/1896* (2013.01); *H04L 5/0055* (2013.01)

(56) References Cited

U.S. PATENT DOCUMENTS

| | | | |
|---|---|---|---|
| 2011/0300854 A1* | 12/2011 | Shan | H04L 1/1887 455/422.1 |
| 2017/0013641 A1 | 1/2017 | Patel et al. | |
| 2018/0139779 A1 | 5/2018 | Kim et al. | |
| 2018/0249513 A1* | 8/2018 | Chang | H04W 72/04 |
| 2018/0317218 A1* | 11/2018 | Li | H04W 72/1268 |
| 2018/0368117 A1* | 12/2018 | Ying | H04L 1/0061 |
| 2019/0058986 A1* | 2/2019 | Loehr | H04L 1/1825 |
| 2020/0221444 A1* | 7/2020 | Tiirola | H04L 1/1812 |
| 2020/0328848 A1* | 10/2020 | He | H04L 1/1854 |

FOREIGN PATENT DOCUMENTS

| | | |
|---|---|---|
| JP | 2018101823 A | 6/2018 |
| JP | 2018520614 A | 7/2018 |
| WO | WO-2018014704 A1 | 1/2018 |
| WO | WO-2018075828 A1 | 4/2018 |

OTHER PUBLICATIONS

Interdigital Communications: "Resource Allocation for DL HARQ Feedback", 3GPP Draft; R1-1709012. 3rd Generation Partnership Project (3GPP), Mobile Competence Centre, vol. RAN WG1, No. 89, Hangzhou; May 15, 2017-May 19, 2017, May 6, 2017, Retrieved from the Internet: https://www.3gpp.org/ftp/tsg_ran/WG1_RL1/TSGR1_89/Docs/.

Huawei, Hisilicon, "Views on NR URLLC work in Rel-16", 3GPP TSG RAN Meeting #80, RP-180889, La Jolla, USA, Jun. 11-14, 2018.

Huawei, Hisilicon, Nokia, Nokia Shanghai Bell, "New SID on Physical Layer Enhancements for NR URLLC", 3GPP TSG-RAN#80, RP-181477, La Jolla, US, Jun. 11-14, 2018.

3GPP, TS38.300 v15.2.0, NR; NR and NG-RAN Overall Description; Stage 2, 3GPP (Server release date: Jun. 20, 2018).

3GPP, TS38.321 v15.2.0, NR; Medium Access Control (MAC) protocol specification (Release 15), 3GPP (Server release date: Jun. 20, 2018).

3GPP, TS36.213 v13.7.0, Evolved Universal Terrestrial Radio Access (E-UTRA); Physical layer procedures(s06-s09), (Server release date: Sep. 24, 2017).

Samsung, "HARQ for Numerology Multiplexing". [online], 3GPP TSG RAN WG2 #97 bis R2-1703453, 2017.

Lenovo, Motorola Mobility, "UL grant-free transmission for URLLC" [online], 3GPP TSG RAN WG1 #88b R1-1705654, Apr. 2017.

Huawei, Hisilicon, "CORESET configuration and search space design", [online], 3GPP TSG RAN WG1 #90b R1-1717062,Oct. 2017.

* cited by examiner

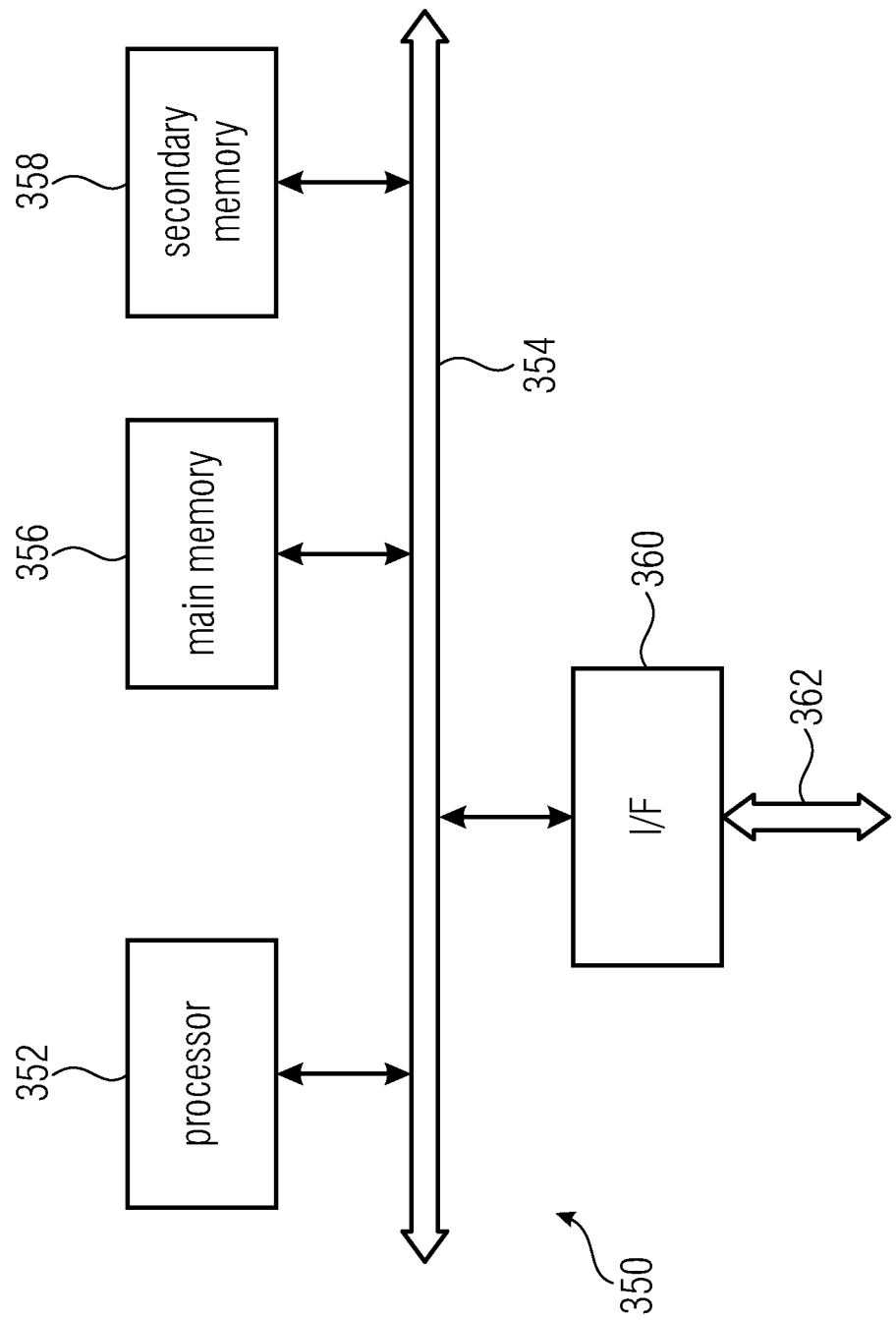

LOW LATENCY HARQ PROTOCOL FOR URLLC SERVICES

CROSS-REFERENCES TO RELATED APPLICATIONS

This application is a continuation of copending International Application No. PCT/EP2019/071255, filed Aug. 7, 2019, which is incorporated herein by reference in its entirety, and additionally claims priority from European Applications No. EP 18 188 369.5, filed Aug. 9, 2018, which is incorporated herein by reference in its entirety.

BACKGROUND OF THE INVENTION

The present invention relates to the field of mobile communication systems, more specifically to techniques checking or verifying if information sent by a transmitter has been correctly received at a receiver so as to initiate a retransmission in case of a non-successful transmission of the information. Embodiments relate to simultaneous synchronous and asynchronous HARQ, hybrid automatic repeat request, operations in a network entity of the wireless communication system, like a base station or a user equipment, UE.

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs".

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length. Each subframe may include one or more slots of 14 OFDM symbols depending on the cyclic prefix (CP) length and subcarrier spacing (SCS). A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by an heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In mobile communication networks, for example in a network like that described above with reference to FIG. 1, like a LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above mentioned devices. Such devices may also communicate directly with each other (D2D communication) using the SL channels.

When considering two UEs directly communicating with each other over the sidelink, both UEs may be served by the same base station, i.e., both UEs may be within the coverage area of a base station, like one of the base stations depicted in FIG. 1. This is referred to as a "in coverage" scenario. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIG. 1, rather, it means that these UEs are not connected to a base station, for example, they are not in a RRC connected state. Yet another scenario is called a "partial coverage" scenario, in accordance with which one of the two UEs which communicate with each other over the sidelink, is served by a base station, while the other UE is not served by the base station.

FIG. 2 is a schematic representation of a situation in which two UEs directly communicating with each other are both in coverage of a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the sidelink. This configuration is also referred to as a mode 3 configuration.

FIG. 3 is a schematic representation of a situation in which the UEs are not in coverage of a base station, i.e., the respective UEs directly communicating with each other are not connected to a base station, although they may be physically within a cell of a wireless communication network. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 4 configuration. As mentioned above, the scenario in FIG. 3 which is an out-of-coverage scenario does not mean that the respective mode 4 UEs are outside of the coverage 200 of a base station, rather, it means that the respective mode 4 UEs are not served by a base station or are not connected to the base station of the coverage area. Thus, there may be situations in which, within the coverage area 200 shown in FIG. 2, in addition to the mode 3 UEs 202, 204 also mode 4 UEs 206, 208, 210 are present.

In a wireless communication system as described above with reference to FIG. 1, like a LTE system or a 5G/NR system, approaches for checking or verifying if a transmission sent by a transmitter, like a BS, is correctly arrived at a receiver, like a UE, are implemented which request, in case of a non-successful transmission, a retransmission of the information or a retransmission of one or more redundancy versions of the information. Naturally, such a process may also be implemented when transmitting from the UE to the BS. In other words, for handling error packets received at a UE or a gNB, a mechanism is applied to rectify the error. In accordance with LTE or NR, a HARQ mechanism is implemented to correct error packets in the physical layer. In case a receive packet has an error, the receiver may buffer the packet and request a retransmission from the transmitter or sender. Once the receiver received the re-transmitted packet, it may combine with the buffered data prior to channel decoding and error detection, for example, by applying a chase combination approach or an incremental redundancy approach.

FIG. 4 describes briefly an example for a conventional HARQ mechanism as it may also be derived from TS 38.321, section 5.3.2 and 5.4.2 which describes the HARQ operation and entity. FIG. 4 illustrates a transmitter, e.g., a gNB, which sends a data packet 1 to a receiver, e.g., a UE. The data packet 1(1) is initially transmitted, and the receiver attempts to decode the received data packet. If the data packet was successfully decoded the receiver delivers the data packet from the MAC/PHY layer to an upper layer. If the data packet was not successfully decoded the receiver buffers the data packet in a soft buffer as is indicate at ① in FIG. 4. Further, the receiver send the NACK message to the transmitter, and, responsive to the NACK message, the transmitter sends a retransmission 1(2) of the data packet. The buffered initial transmission is combined with the retransmission as is indicated at ②. The combining may use chase combination or incremental redundancy. In case the combined data can be decoded, as is indicated at ③, the ACK message is send to the transmitter to indicate the successful transmission.

The HARQ mechanism may include a synchronous HARQ process or an asynchronous HARQ process.

When applying the asynchronous HARQ process, the gNB may use any of the available HARQ processes, for example a process out of the 8 SAW, Stop&Wait, processes for the downlink. FIG. 5 illustrates an 8-channel Stop-and-Wait HARQ protocol according to which during a time period, which may be the minimum time until a retransmission may be send due to a missing ACK/NACK or due to received NACK, further data packets are transmitted. In the latter case (receipt of a NACK) the time period is defined by the processing time for decoding at the receiver a data packet and the processing time at the transmitter for decoding the ACK/NACK message related to the data packet. The gNB provides instructions to the UE regarding which HARQ process will be used during each sub-frame for which resources are allocated, and the respective identity or HARQ process ID may be included within a PDCCH transmission. The asynchronous HARQ process come together with an increase in the signaling overhead as it needs to include the HARQ process ID within the DCI message, but increases flexibility as retransmissions do not have to be scheduled during every sub-frame. FIG. 6 illustrates an adaptive asynchronous HARQ at is may be used in NR. FIG. 6 shows the minimum time until a retransmission may be send due to a missing ACK/NACK so that a retransmission for HARQ process #0 may be made at a time after this minimum time. When scheduling the retransmission, the HARQ process number #0-#7 and the location of the retransmission in frequency and transport format are signaled. Thus, the process is adaptive with regard to the location and the transport format.

When applying the synchronous HARQ process retransmissions are scheduled at fixed time intervals, thereby generating a reduced overhead signaling as it is not needed to include an information about the process to be used, for example the HARQ process identifier, into the outgoing data. The process is cyclic, so that even if no resources are allocated during a specific subframe, the first process will repeat at the initially scheduled intervals, for example, after every 8 ms.

FIG. 7 illustrates schematically a synchronous HARQ process in a LTE wireless communication system using adaptive or non-adaptive transmissions/operations. FIG. 7 illustrates a sub-frame n, a sub-frame n+8 and a sub-frame n+16. At sub-frame n, the synchronous ARQ process is scheduled using the PDCCH, causing the retransmissions to be scheduled in multiples of the HARQ roundtrip time, RTT, which may be 8 sub-frames. In a non-adaptive operation, the HARQ feedback on the physical hybrid ARQ indicator channel, PHICH, is used to determine, if a retransmission is needed or not. In FIG. 7, it is assumed that the received information in sub-frame n included an error, i.e., the transmission to a receiver, like a UE, was not successful so that, on the PHICH the non-acknowledgement message NACK is transmitted. Dependent on the scheduled initial uplink resource, there is a unique PHICH resource corresponding to the non-successful transmission, and the retransmission will be provided with the same MCS on the same frequency resource using the corresponding retransmission slot, which, in the example of FIG. 7 is at sub-frame n+8. In other words, in a non-adaptive HARQ operation, the retransmission is triggered at the sender or transmitter once a NACK message is received on the PHICH, and, at the next time for doing a transmission, the same resources as in the previous transmission are used, i.e., MCS and resource blocks, RBs, remain unchanged. FIG. 8 illustrates non-adaptive synchronous HARQ at is may be used for ULLRC services. The operation is synchronous in time meaning that the HARQ processes #0-#7 are served one after the other, and a retransmission occurs exactly N slots/symbols after last transmission so that there is no need to signal the process number. This limited scheduling freedom comes together with a minimum uplink signaling overhead and a minimum delay.

In case of an adaptive synchronous HARQ operation, the PHICH is ignored if a DCI message is received via the PDCCH indicating an adaptive retransmission, as is indicated between sub-frame n+8 and sub-frame n+16 in FIG. 7. Although in the adaptive operation the MCS and frequency resource may be changed using the DCI signaling the adaptive transmission operation, still, since it is a synchronous HARQ process, the retransmission sub-frame is already predetermined by the initial transmission at sub-frame n and will be carried out at the next retransmission time, which, in the example of FIG. 7 is sub-frame n+16.

In accordance with the LTE Rel.8, synchronous HARQ processes are only used in the uplink, and the synchronous HARQ process may be operated either in the adaptive or non-adaptive mode, as described above.

NR Rel.15 introduces an asynchronous HARQ process to be used also in the uplink direction so that the retransmission is prescheduled by the gNB. However, this results in additional latency needed for scheduling, and since there is no explicit acknowledgement message, ACK, anymore, the UE needs to store relevant information in its HARQ processes until a new transmission is started on the same HARQ process.

It is noted that the information in the above section is only for enhancing the understanding of the background of the invention and therefore it may contain information that does not form conventional technology that is already known to a person of ordinary skill in the art.

SUMMARY

An embodiment may have an apparatus, wherein the apparatus is configured to receive one or more data packets from a transmitter in a wireless communication system, the data packets transmitted over a radio channel of the wireless communication system, and request from the transmitter a retransmission for a data packet in case of a non-successful transmission of the data packet, and the apparatus includes a plurality of Hybrid ARQ, HARQ, entities, the plurality of HARQ, entities including at least a first HARQ entity and a second HARQ entity, the first HARQ entity to perform a first HARQ operation, and the second HARQ entity to perform a second HARQ operation, the first and second HARQ operations being different, or a Hybrid ARQ, HARQ, entity performing a first HARQ operation and a second HARQ operation, the first and second HARQ operations being different.

Another embodiment may have an apparatus, apparatus, wherein the apparatus is configured to transmit one or more data packets to a receiver in a wireless communication system, the data packets transmitted over a radio channel of the wireless communication system, and receive from the receiver a request for a retransmission for a data packet in case of a non-successful transmission of the data packet, and the apparatus includes a plurality of Hybrid ARQ, HARQ, entities, the plurality of HARQ, entities including at least a first HARQ entity and a second HARQ entity, the first HARQ entity to perform a first HARQ operation, and the second HARQ entity to perform a second HARQ operation, the first and second HARQ operations being different, or a Hybrid ARQ, HARQ, entity performing a first HARQ operation and a second HARQ operation, the first and second HARQ operations being different.

Another embodiment may have a wireless communication network, including: one or more base stations, BS, and one or more user equipments, UEs, a UE being served by one or more BSs or communication directly with one or more other UEs while being in connected mode or idle mode, wherein a base station and/or a UE includes the apparatus according to the invention.

Another embodiment may have a method, having the steps of: receiving one or more data packets from a transmitter in a wireless communication system, the data packets transmitted over a radio channel of the wireless communication system, and requesting from the transmitter a retransmission for a data packet in case of a non-successful transmission of the data packet, wherein the retransmission includes providing a first HARQ operation and/or a second HARQ operation, the first and second HARQ operations being different, wherein a plurality of Hybrid ARQ, HARQ, entities is provided, the plurality of HARQ, entities including at least a first HARQ entity and a second HARQ entity, the first HARQ entity performing the first HARQ operation, and the second HARQ entity performing the second HARQ operation, or a Hybrid ARQ, HARQ, entity is provided performing the first HARQ operation and the second HARQ operation, the first and second HARQ operations being different.

Another embodiment may have a method, having the steps of: transmitting one or more data packets to a receiver in a wireless communication system, the data packets transmitted over a radio channel of the wireless communication system, receiving from the receiver a request for a retransmission for a data packet in case of a non-successful transmission of the data packet, and wherein the retransmission includes providing a first HARQ operation and/or a second HARQ operation, the first and second HARQ operations being different, wherein a plurality of Hybrid ARQ, HARQ, entities is provided, the plurality of HARQ, entities including at least a first HARQ entity and a second HARQ entity, the first HARQ entity performing the first HARQ operation, and the second HARQ entity performing the second HARQ operation, or a Hybrid ARQ, HARQ, entity is provided performing the first HARQ operation and the second HARQ operation, the first and second HARQ operations being different.

Another embodiment may have a non-transitory digital storage medium having a computer program stored thereon to perform the method, having the steps of: receiving one or more data packets from a transmitter in a wireless communication system, the data packets transmitted over a radio channel of the wireless communication system, and requesting from the transmitter a retransmission for a data packet in case of a non-successful transmission of the data packet, wherein the retransmission includes providing a first HARQ operation and/or a second HARQ operation, the first and second HARQ operations being different, wherein a plurality of Hybrid ARQ, HARQ, entities is provided, the plurality of HARQ, entities including at least a first HARQ entity and a second HARQ entity, the first HARQ entity performing the first HARQ operation, and the second HARQ entity performing the second HARQ operation, or a Hybrid ARQ, HARQ, entity is provided performing the first HARQ operation and the second HARQ operation, the first and second HARQ operations being different, when said computer program is run by a computer.

Another embodiment may have a non-transitory digital storage medium having a computer program stored thereon to perform the method, having the steps of: transmitting one or more data packets to a receiver in a wireless communication system, the data packets transmitted over a radio channel of the wireless communication system, receiving from the receiver a request for a retransmission for a data packet in case of a non-successful transmission of the data packet, and wherein the retransmission includes providing a first HARQ operation and/or a second HARQ operation, the first and second HARQ operations being different, wherein a plurality of Hybrid ARQ, HARQ, entities is provided, the plurality of HARQ, entities including at least a first HARQ entity and a second HARQ entity, the first HARQ entity performing the first HARQ operation, and the second HARQ entity performing the second HARQ operation, or a Hybrid ARQ, HARQ, entity is provided performing the first HARQ operation and the second HARQ operation, the first and second HARQ operations being different, when said computer program is run by a computer.

BRIEF DESCRIPTION OF THE DRAWINGS

Embodiments of the present invention will be detailed subsequently referring to the appended drawings, in which:

FIG. 14 illustrates an example of a computer system on which units or modules as well as the steps of the methods described in accordance with the inventive approach may execute.

DETAILED DESCRIPTION OF THE INVENTION

Embodiments of the present invention is now described in more detail with reference to the accompanying drawings in which the same or similar elements have the same reference signs assigned.

The present invention addresses the way the HARQ processes are currently implemented, which is disadvantageous because in certain scenarios, like mobile communication scenarios, a single UE may support different service types simultaneously. The different service types may have different latency requirements, for example, a delay non-critical service, like a eMBB service, and a delay critical service like a URLLC service, may be supported simultaneously by a single UE. In such a situation, the radio transmission technology, RAT, needs to handle each service type, for example in terms of data rate, latency and reliability. However, in current releases, like LTE Rel.8 and NR Rel.15, the HARQ design is limited. For example, NR uses a synchronous HARQ in uplink and downlink transmissions, and the retransmissions are explicitly scheduled using the PDCCH resource allocation for providing high flexibility. The gNB spends time to execute scheduling before sending the resource allocation, and the HARQ feedback channel may send immediately the ACK/NACK message. However, for delay critical traffic, like URLLC traffic, the burden on scheduling HARQ retransmissions is substantial and causes additional delays in the transmission. Additionally, also for massive Machine-Type Communication (mMTC) this demands a higher receiver complexity and reduces the battery lifetime.

Figure 1:
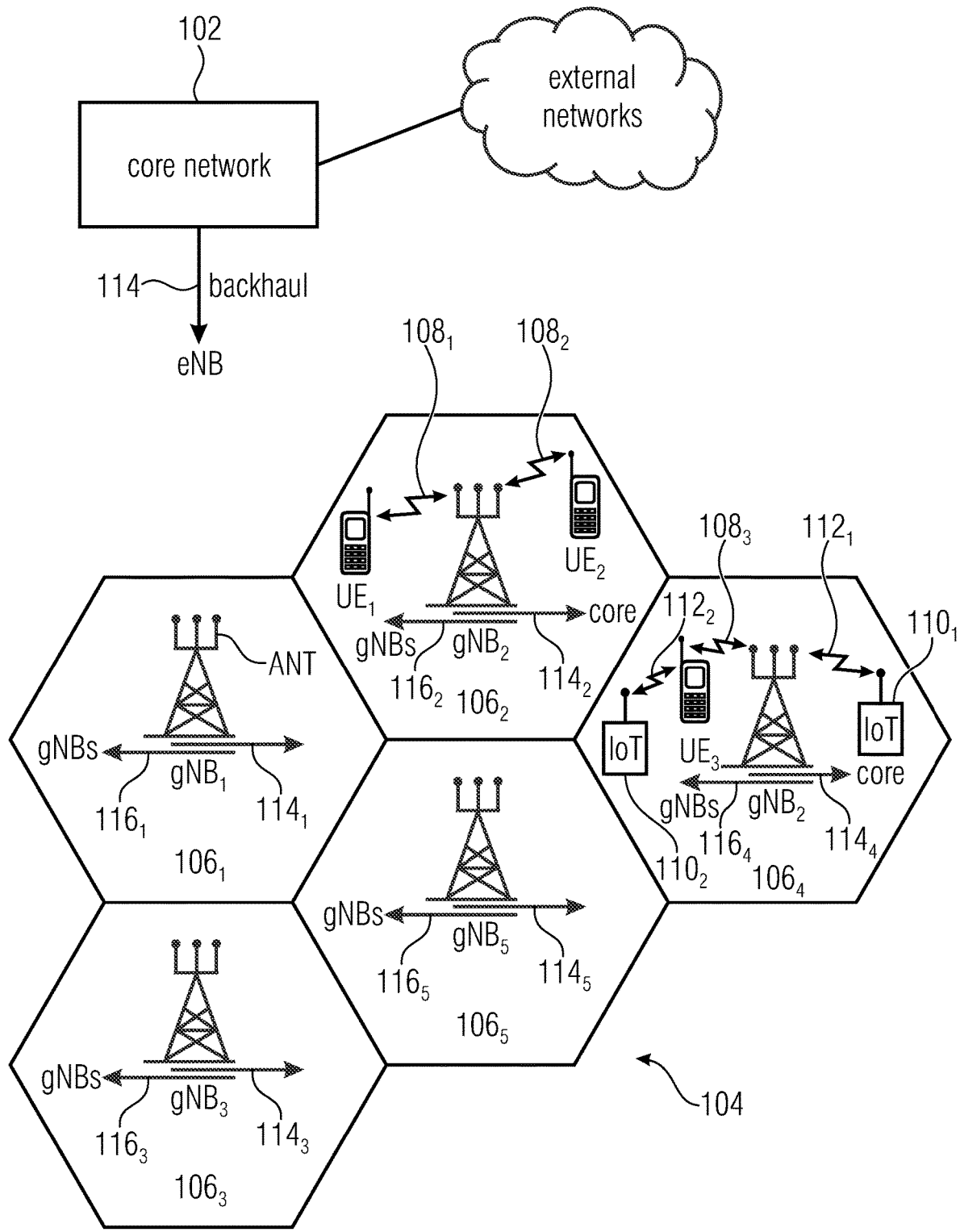
FIG. 1 shows a schematic representation of an example of a wireless communication system.
Figure 2:
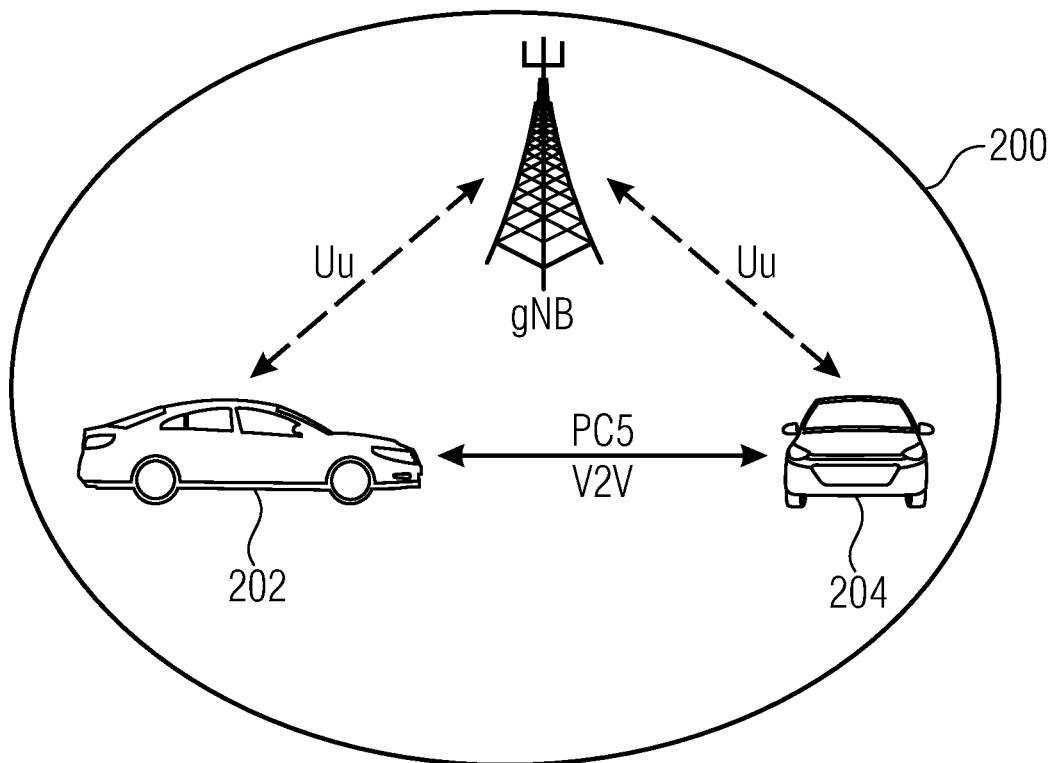
FIG. 2 shows a schematic representation of a situation in which UEs directly communicating with each other are in coverage of a base station.
Figure 3:
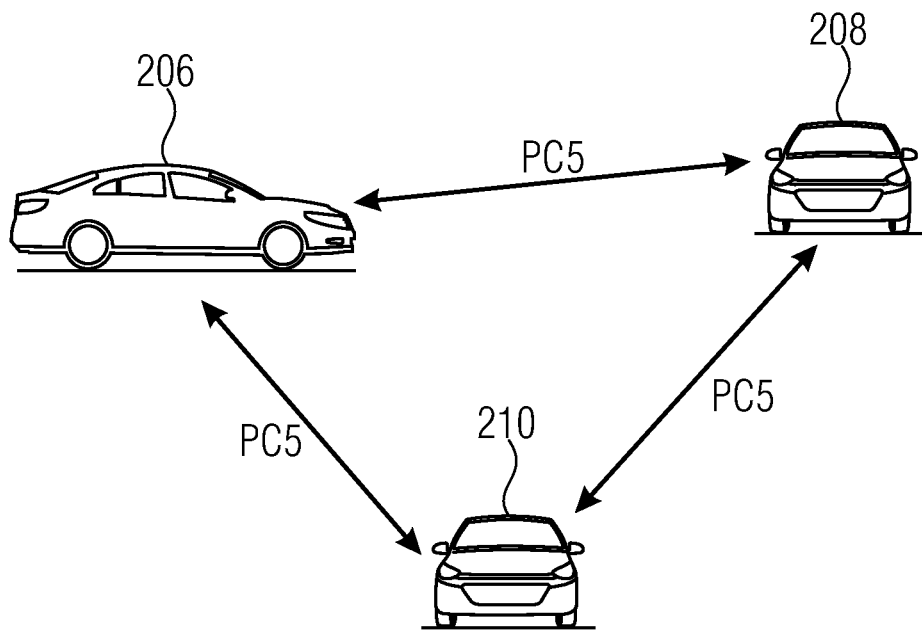
FIG. 3 shows a scenario in which UEs directly communicating with each other are not are not in coverage of a base station, i.e., are not connected to a base station.
Figure 4:
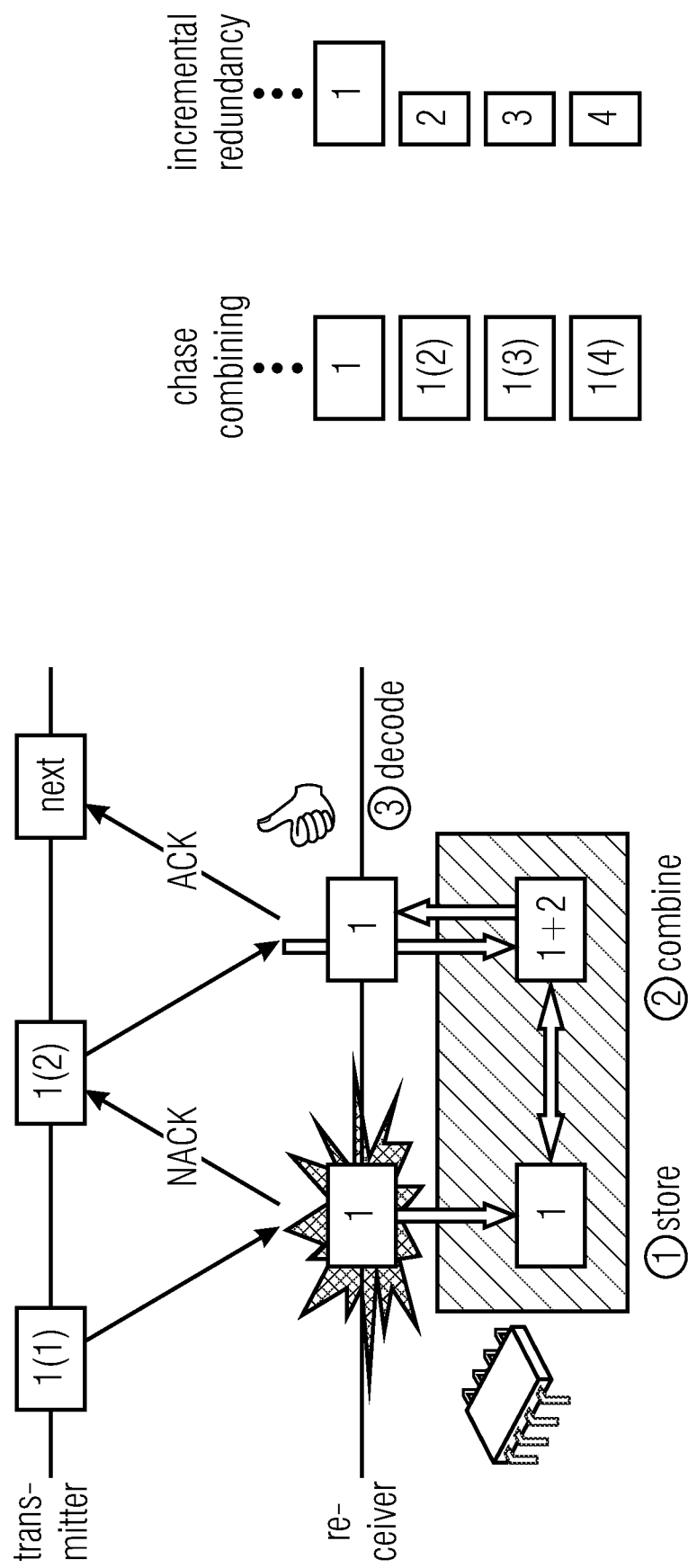
FIG. 4 describes briefly an example for a conventional HARQ mechanism as it may also be derived from TS 38.321, section 5.3.2 and 5.4.2 which describes the HARQ operation and entity.
Figure 5:
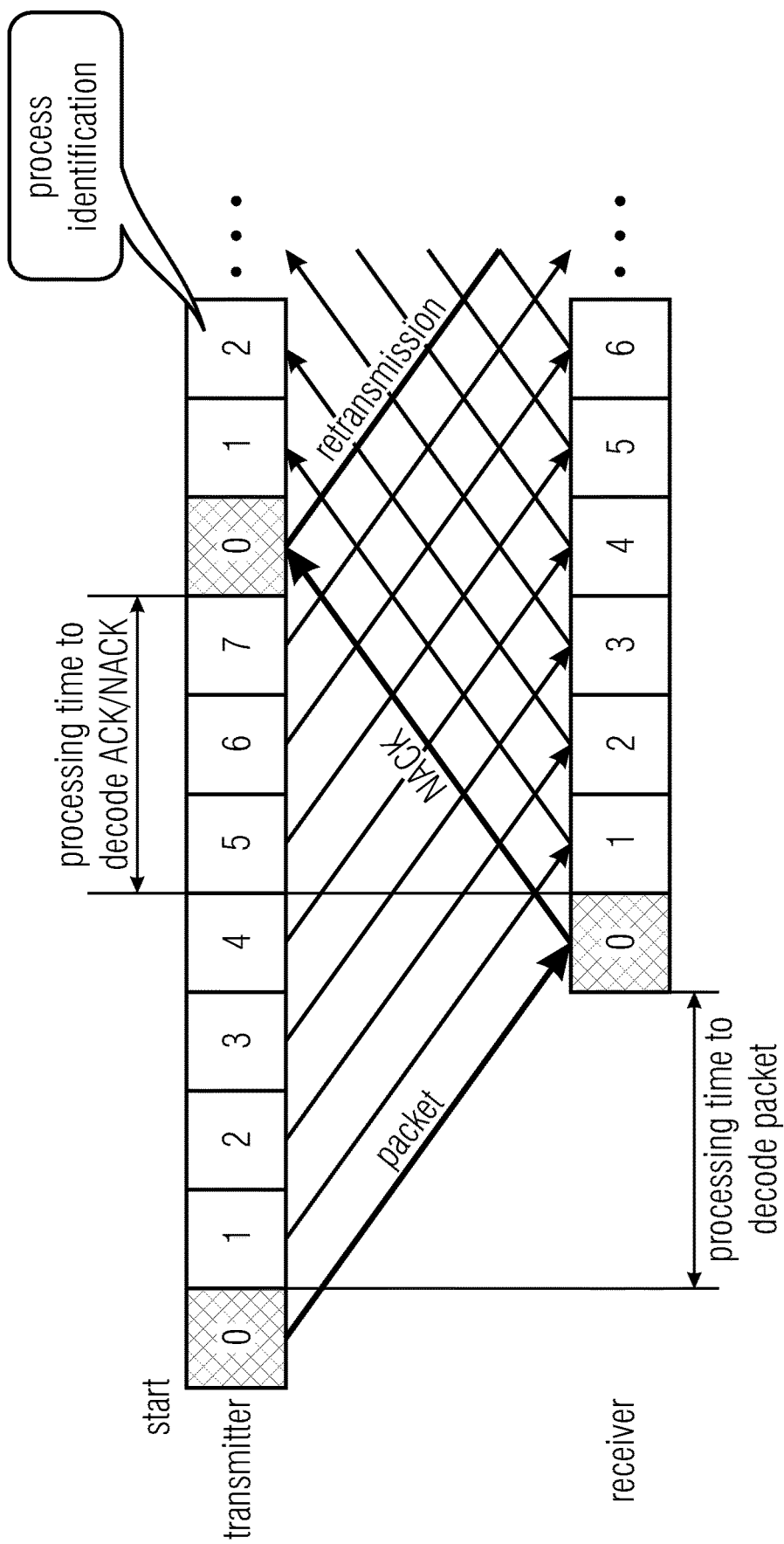
FIG. 5 illustrates an 8-channel Stop-and-Wait HARQ protocol.
Figure 9:
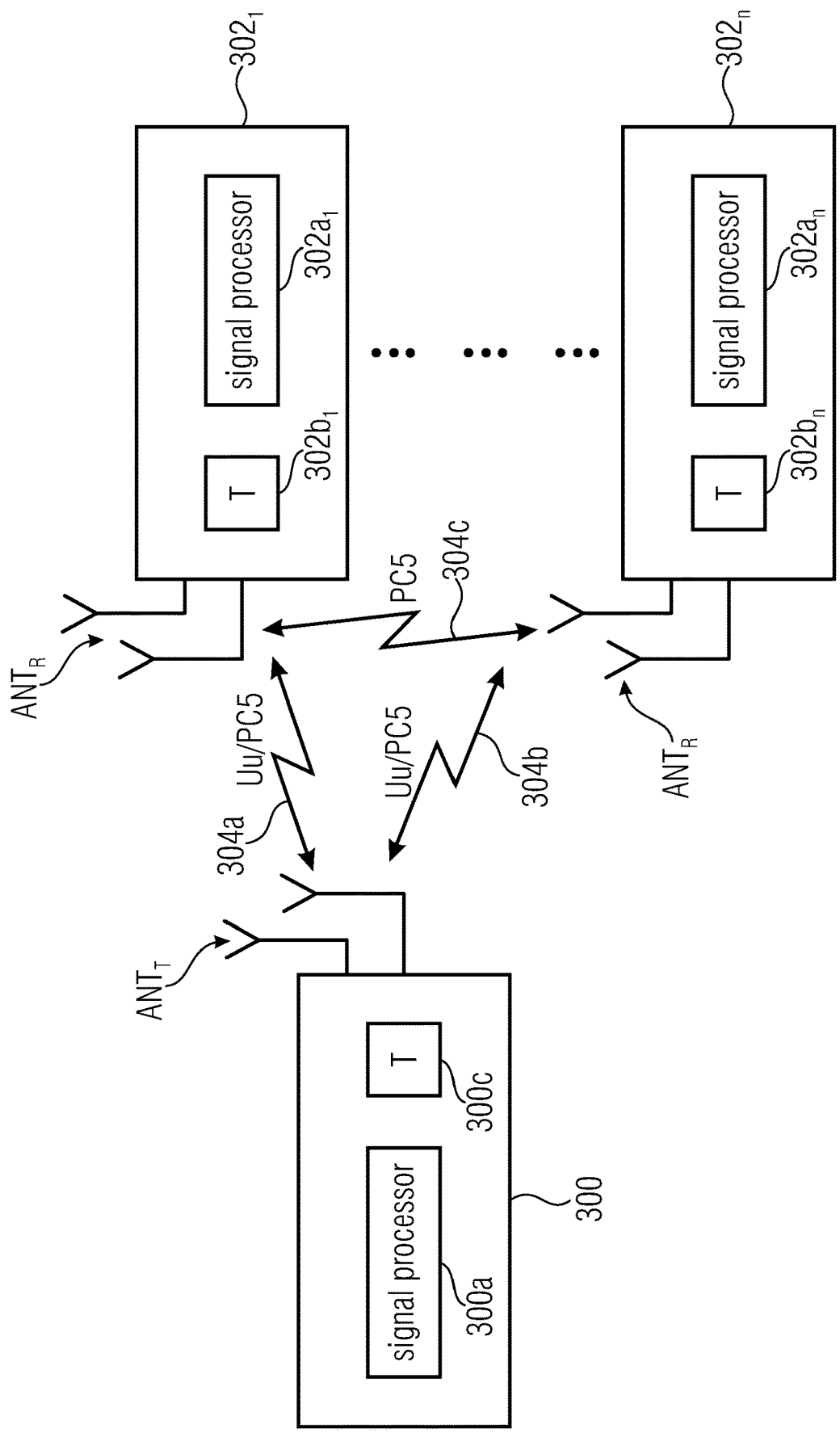
FIG. 9 is a schematic representation of a wireless communication system for communicating information between a transmitter and one or more receivers in accordance with embodiments of the present invention.
Figure 10:
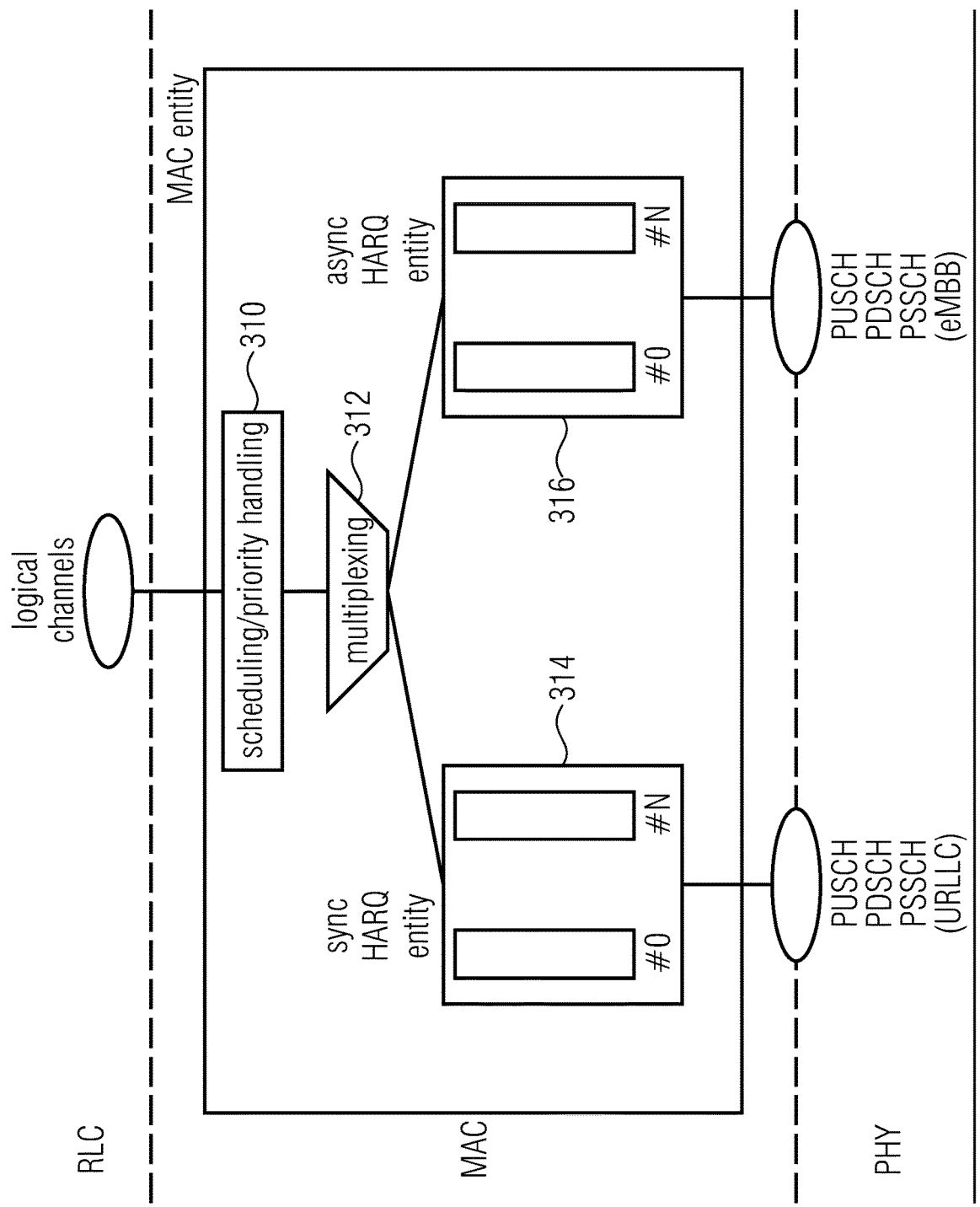
FIG. 10 illustrates an embodiment of a layer structure for implementing synchronous and asynchronous HARQ operation at the base station or the user equipment using a common MAC entity in the MAY layer.

This is addressed by the present invention as described hereinbelow in more detail, and embodiments of the present invention may be implemented in a wireless communication system as depicted in FIG. 1, FIG. 2 and FIG. 3 including base stations and users, like mobile terminals or IoT devices. FIG. 9 is a schematic representation of a wireless communication system for communicating information between a transmitter 300 and one or more receivers $302_1$ to $302_1$. The transmitter 300 and the receivers 302 may communicate via a wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other.

In accordance with an embodiment, as for example also depicted in FIG. 2, the transmitter 300 may be a base station and the receivers may be UEs. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface.

In accordance with an embodiment, as for example also depicted in FIG. 3, the transmitter 300 may be a first UE and the receivers may be further UEs. The first UE 300 and the further UEs 302 may communicate via respective wireless communication links 304a to 304c, like a radio link using the PC5 interface.

The transmitter 300 and the one or more receivers 302 may operate in accordance with the inventive teachings described herein.

Apparatus Receiving Data, Like a UE or BS, Requesting a Retransmission, and Supporting One or More HARQ Entities The present invention provides an apparatus, wherein the apparatus is configured to receive one or more data packets from a transmitter in a wireless communication system, the data packets transmitted over a radio channel of the wireless communication system, and request from the transmitter a retransmission for a data packet in case of a non-successful transmission of the data packet, and the apparatus comprises a plurality of Hybrid ARQ, HARQ, entities, the plurality of HARQ, entities including at least a first HARQ entity and a second HARQ entity, the first HARQ entity to perform a first HARQ operation, and the second HARQ entity to perform a second HARQ operation, the first and second HARQ operations being different, or a Hybrid ARQ, HARQ, entity performing a first HARQ operation and a second HARQ operation, the first and second HARQ operations being different.

Apparatus Transmitting Data, Like a BS or UE, Receiving a Request for Retransmission, and Supporting One or More HARQ Entities The present invention provides an apparatus, wherein wherein the apparatus is configured to transmit one or more data packets to a receiver in a wireless communication system, the data packets transmitted over a radio channel of the wireless communication system, and receive from the receiver a request for a retransmission for a data packet in case of a non-successful transmission of the data packet, and the apparatus comprises a plurality of Hybrid ARQ, HARQ, entities, the plurality of HARQ, entities including at least a first HARQ entity and a second HARQ entity, the first HARQ entity to perform a first HARQ operation, and the second HARQ entity to perform a second HARQ operation, the first and second HARQ operations being different, or a Hybrid ARQ, HARQ, entity performing a first HARQ operation and a second HARQ operation, the first and second HARQ operations being different.

With respect to both apparatuses the following may apply.

Re application of 1st and/or 2nd HARQ operations.

In accordance with embodiments, responsive to a signaling or based on an association between a logical channel the data packet belongs to and the HARQ entity, the apparatus applies for the one or more data packets the first HARQ operation, or the second HARQ operation, or the first and second HARQ operations simultaneously.

Re what the operations may be.

In accordance with embodiments, the first and second HARQ operations comprise one or more of a Stop-and-Wait ARQ protocol, a window based ARQ protocol, a synchronous protocol, the synchronous protocol scheduling the one or more retransmissions and/or the one or more HARQ ACK/NACKs at pre-defined time instances after the initial transmission, an asynchronous protocol, the asynchronous protocol scheduling the one or more retransmissions and/or the one or more HARQ ACK/NACKs dynamically in time.

Packets of both types may be processed.

In accordance with embodiments, the apparatus is configured to process both data packets of a first logical channel and data packets of a second logical channel.

Re what the types may be.

In accordance with embodiments, the data packet of the first logical channel includes a data packet provided by a delay critical service of the wireless communication system, like an URLLC service having, e.g., a low rate and/or a low latency, or a data packet having associated therewith a first Quality of Service, QoS, or a data packet having associated therewith a first guaranteed bit rate, GBR, and wherein the data packet of the second logical channel includes a data packet provided by a delay non-critical service of the wireless communication system, like an eMBB service having, e.g., a high rate and/or a medium latency requirement or a mMTC service having, e.g., a low rate and/or a low latency requirement, or a data packet having associated therewith a second QoS, the first QoS being higher than the second QoS, or a data packet having associated therewith a second GBR, the first GBR being higher than the second GBR.

Re the configuration of HARQ entities.

In accordance with embodiments, the first HARQ entity is preconfigured with the first HARQ operation, and the second HARQ entity is preconfigured with the second HARQ operation, or each of the first and second HARQ entities are preconfigured with a HARQ operation having different settings, the settings of the HARQ operation being configurable, responsive to the signaling or based on the association, to implement the first HARQ operation or the second HARQ operation.

Re establishment and configuration of settings of HARQ entities.

In accordance with embodiments, the apparatus is configured to receive a configuration message or a reconfiguration message, e.g. using the RRC protocol, the configuration/reconfiguration message causing the apparatus to establish the first and second HARQ entity and/or to configure/reconfigure the settings of the first and second HARQ entities to perform the first and second HARQ operations.

Re the possibility of the configuration being received from gNB.

In accordance with embodiments, the apparatus is to
receive the configuration message or the reconfiguration message from a base station, gNB, decode the configuration message or the reconfiguration message and configure the MAC Layer and/or Physical Layer so as to establish and/or to configure/reconfigure the first and second HARQ entities to provide HARQ retransmissions.

HARQ entities may be defined by standard.

In accordance with embodiments, the establishment and/or configuration of first and second HARQ entities is a predefined procedure and/or configuration specified in the standard.

Re possible differences in 1st and/or 2nd HARQ entities

In accordance with embodiments, the first and second HARQ entities comprise and/or supports one or more of
different numbers of HARQ processes, HARQ processes supporting a different number of data packets, e.g. Transport Blocks, depending on the spatial multiplexing scheme being used different redundancy versions, different sequences of redundancy versions, RVs, different channels for ACK/NACK reporting, different ACK/NACK timings, a different maximum number of HARQ retransmissions, different aggregation factors for bundling transmissions of a data packet, like a Transport Block, in multiple transmission parts of the same bundle, different target Block Error Rates, BLERs for all transmissions and/or specific retransmissions.

Re parallel HARQ processes.

In accordance with embodiments, each HARQ entity maintains one or more parallel HARQ processes, each HARQ process being associated with a HARQ process identifier, wherein the HARQ process identifier may either be selected autonomously out of a pool of HARQ processes (e.g., by timing of the initial transmission and/or retransmissions) or predefined by a sequence number or dynamically selected by an apparatus (e.g. a gNB base station) and signaled to an apparatus (e.g. a User Equipment).

HARQ entities may be semi-statically/dynamically associated with logical channels.

In accordance with embodiments, the first and second HARQ entities are semi-statically configured and/or associated to different logical channels, e.g., by RRC configuration/reconfiguration, and/or are dynamically scheduled, e.g., by the MAC scheduler.

DCI signaling may be used for distinguishing HARQ entities/protocols.

In accordance with embodiments,
a first and second HARQ entity are semi-statically configured and/or associated to different logical channel and the apparatus is configured to determine for a received resource assignment on the PDCCH control channel which of the first and second HARQ entities to select and/or to apply either using one or more specific Radio Network Temporary Identifiers, RNTIs, or one or more DCI formats, or a HARQ Entity Selector being part of HARQ information send with a DCI format, or a PDCCH resource assignment on configurable Control Resource Sets, CORESETs, on different physical resources, or different Physical Channels, e.g., a low latency PDSCH or low latency PUSCH.

In accordance with embodiments, the first and second HARQ entities are located at the MAC layer and being associates and/or linked and/or mapped to one or more Physical Layer procedures or Physical Layer channels such as one or more of different downlink resource allocation methods e.g. scheduled on the PDCCH, different PDCCH monitoring periodicity.

different DCI formats for downlink, uplink and sidelink scheduling via the PDCCH on the PHY, different RNTIs indicated in the DC's for scheduling via the PDCCH on the PHY, different downlink control channels to request uplink retransmission e.g. a retransmission requested via a PDCCH resource allocation, a retransmission requested via a NACK transmission on a Physical HARQ ACK/NACK indicator channel, PHICH, different physical channels for data transmission e.g. PDSCH, Low Latency PDSCH different uplink grant methods e.g. scheduled on PDCCH, a response message to a uplink random access, preconfigured uplink grants and/or a semi-persistent scheduling, different uplink control channels to request downlink retransmission e.g. a retransmission requested via and NACK part of the Uplink Control Information, UCI, send via a PUCCH control channel, or via a Low Latency PUCCH control channel, via PUCCHs with different formats (e.g. short and long PUCCH format), via a Compact PUCCH.

In accordance with embodiments, the first and second HARQ entities are located at the MAC layer providing downlink control information or uplink control information to the physical layer (e.g. to support the transmission or reception of data packet or to request a retransmission) for transmission and/or to support Physical Layer operation such as
- different control information bits in the Downlink Control Information e.g. different bits (incl. not bits) for HARQ process identifiers, for redundancy version number, for the new data indicator (NDI), for ACK/NACK timing/resource information, or
- different control information bits in the Uplink Control Information, UCI, send from the MAC layer to the PHY layer e.g. ACK/NACKs for Code Block Groups or ACK/NACKs for Transport Blocks, single ACK/NACK, multiple ACK/NACKs, bundled ACK/NACKs, In accordance with embodiments, when using the RNTI, the apparatus is configured to receive a configuration and/or reconfiguration message, e.g. via RRC signaling, the configuration message causing the apparatus to be configured with a new RNTI which is associated with the first or second HARQ entity, so that the apparatus, upon a blind decoding process testing all RNTIs, determines which of the first or second HARQ entities to select and/or apply.

In accordance with embodiments, the DCI format comprises a first DCI format that explicitly signals associated HARQ control information and a second DCI format that does not explicitly signal all HARQ control information, the non-signaled HARQ control information being derived by the apparatus, wherein the first DCI may be used for the initial transmission, and the second DCI format may be used for the one or more retransmissions, and
the apparatus is configured to
test all PDCCH candidates against second DCI formats and against the first DCI format, and
evaluate the embedded checksum to identify which one of the first DCI format and the second DCI format has been received so as to determine which of the first or second HARQ entities to apply.

Re section 3.1.4: Dedicated PUCCHs for each UE HARQ entity/protocol.

In accordance with embodiments, each of the first and second receiving HARQ entities located at the MAC layer send ACK/NACK control information to the Physical Layer for transmission on a dedicated control channel for an HARQ ACK/NACK feedback to the transmitting HARQ entities, like a Physical Uplink Control Channel, PUCCH or a Physical Hybrid Indicator Channel, PHICH.

Re the possibility of the PHICH being limited to ACK/NACK}

In accordance with embodiments, the control channel comprises the PHICH, the PHICH transmitting only ACK/NACK messages.

In accordance with embodiments, the apparatus, responsive to a NACK on the PHICH, performs the retransmission with a fixed format on same resource used of the preceding transmission/retransmission, wherein a predefined sequence of RVs may be used.

Re the possibility of using LL-PUCCH for ACK/NACK}

In accordance with embodiments, the control channel comprises a low latency PUCCH including the ACK/NACK message, the low latency PUCCH being send more frequently than a regular PUCCH and/or the low latency PUCCH carrying a smaller payload than a regular PUCCH.

Re LL-PUCCH for ACK/NACK+CSI.

In accordance with embodiments, the apparatus is configured to
estimate the radio channel (e.g. based on Demodulation Reference Symbols, DM-RS) over which the data packet is transmitted and/or decodes the control channel (e.g. PDCCH) with the resource allocation of the data packet to provide a CSI, responsive to receiving the data packet and prior to processing the data packet, and
include the CSI into a low latency PUCCH or transmit the CSI once obtained using a first low latency PUCCH and ahead of the ACK/NACK message which is send in a second low latency PUCCH.

Re section 3.2. DCI miss detection and rescheduling of retransmissions.

In accordance with embodiments, the apparatus is configured to
detect a missing PUCCH for a HARQ ACK/NACK, which indicates that the receiver missed an initial scheduling of the transmission by the apparatus, and
responsive to detecting the miss, reschedule the same transmission or the initial transmission or the next redundancy version, RV, explicitly with a PDCCH at the next opportunity.

In accordance with embodiments, in case of a PUCCH format 0-1, the apparatus is configured to perform a power thresholding to detect a missing PUCCH transmission, and in case of a PUCCH format 2-41, the apparatus is configured to perform a checksum detection, and a mismatch in the embedded checksum indicates the missing of the initial grant.

Re the possibility that the apparatus signals HARQ entity capabilities.

In accordance with embodiments, the apparatus is configured to signal the capabilities (e.g. by means of a RRC UE Capability exchange message) for the first and second HARQ entities or for the apparatus one or more of
the number of supported HARQ entities,
the number of available HARQ processes,
the available HARQ soft buffer,
the supported DCI formats,
the supported physical channels,
if a low latency PUCCH is supported.
The apparatus may be a BS or a UE.
In accordance with embodiments,
the wireless system comprises one or more base stations, BS, and one or more user equipments, UEs, a UE being served by one or more BSs or communication directly with one or more other UEs while being in connected mode or idle mode, and
the apparatus comprises a base station or a UE.

System

The present invention provides a wireless communication network, comprising at least one of the inventive UEs and at least one of the inventive base stations.

In accordance with embodiments, the receiver and the transmitter comprises one or more of: a mobile terminal, or stationary terminal, or cellular IoT-UE, or an IoT device, or a ground based vehicle, or an aerial vehicle, or a drone, or a moving base station, or road side unit, or a building, or a macro cell base station, or a small cell base station, or a road side unit, or a UE, or a remote radio head, or an AMF, or an SMF, or a core network entity, or a network slice as in the NR or 5G core context, or any transmission/reception point (TRP) enabling an item or a device to communicate using the wireless communication network, the item or device being provided with network connectivity to communicate using the wireless communication network.

Accordingly, according to embodiments, a wireless communication network, comprising: one or more base stations, BS, and one or more user equipments, UEs, a UE being served by one or more BSs or communication directly with one or more other UEs while being in connected mode or idle mode, wherein a base station and/or a UE comprises any of the above outlined apparatuses.

In accordance with embodiments
the UE comprise one or more of
  a mobile terminal, or
  stationary terminal, or
  a vehicular terminal, or
  cellular IoT-UE, or
  an IoT device, or
  a ground based vehicle, or
  an aerial vehicle, or
  a drone, or
  a moving base station, or
  road side unit, or
  a building, or
  any other item or device provided with network connectivity enabling the item/device to communicate using the wireless communication network, e.g., a sensor or actuator, and
the BS comprise one or more of
  a macro cell base station, or
  a micro cell base station, or
  a small cell base station, or
  a central unit of a base station, or
  a distributed unit of a base station, or
  a road side unit, or
  a UE, or
  a remote radio head, or
  an AMF, or
  an SMF, or
  a core network entity, or
  a network slice as in the NR or 5G core context, or
  any transmission/reception point (TRP) enabling an item or a device to communicate using the wireless communication network, the item or device being provided with network connectivity to communicate using the wireless communication network.

Methods

The present invention provides a method, comprising:
  receiving one or more data packets from a transmitter in a wireless communication system, the data packets transmitted over a radio channel of the wireless communication system, and
  requesting from the transmitter a retransmission for a data packet in case of a non-successful transmission of the data packet,
  wherein the retransmission comprises providing a first HARQ operation and/or a second HARQ operation, the first and second HARQ operations being different,
  wherein
    a plurality of Hybrid ARQ, HARQ, entities is provided, the plurality of HARQ, entities including at least a first HARQ entity and a second HARQ entity, the first HARQ entity performing the first HARQ operation, and the second HARQ entity performing the second HARQ operation, or
    a Hybrid ARQ, HARQ, entity is provided performing the first HARQ operation and the second HARQ operation, the first and second HARQ operations being different.

The present invention further provides a method, comprising:
  transmitting one or more data packets to a receiver in a wireless communication system, the data packets transmitted over a radio channel of the wireless communication system,
  receiving from the receiver a request for a retransmission for a data packet in case of a non-successful transmission of the data packet, and
  wherein the retransmission comprises providing a first HARQ operation and/or a second HARQ operation, the first and second HARQ operations being different,
  wherein
    a plurality of Hybrid ARQ, HARQ, entities is provided, the plurality of HARQ, entities including at least a first HARQ entity and a second HARQ entity, the first HARQ entity performing the first HARQ operation, and the second HARQ entity performing the second HARQ operation, or
    a Hybrid ARQ, HARQ, entity is provided performing the first HARQ operation and the second HARQ operation, the first and second HARQ operations being different.

Computer Program Product

The present invention provides a computer program product comprising instructions which, when the program is executed by a computer, causes the computer to carry out one or more methods in accordance with the present invention.

Thus, in accordance with embodiments of the present invention, synchronous HARQ is introduced, for example for low latency services, like URLLC, in NR. More specifically, in the uplink, scheduling each transmission of the PDCCH leads to an additional delay, and also in the downlink extra complexity is needed which needs to be avoided for URLLC services. Also, feedback bundling, which increases the spectral efficiency and reliability of the feedback channel, has the drawback of providing for additional latency. In case of URLLC services, the feedback is needed as fast as possible and, therefore, in accordance with the inventive approach, dedicated resources are used for the URLLC HARQ feedback. In the downlink, this corresponds to a HARQ indicator channel containing only the acknowledgement/non-acknowledgement message, ACK/NACK, and in the uplink two specific PUCCH resources which are used for the feedback or for the low-latency CSI, LL-CSI. In accordance with the inventive approach, multiple Hybrid ARQ, HARQ, entities, e.g., two or more HARQ entities preforming different HARQ operations, for example asynchronous HARQ for delay non-critical services, like eMBB services, and synchronous HARQ for delay critical services, like URLLC services.

In accordance with embodiments, the communication systems configures data flows across multiple layers with QoS flows, Signaling and Radio Bearers, RLC flows, Logical Channels, Transport Channels and Physical Channels. Services may correspond to QoS flows and are mapped to a Radio Bearer. HARQ may be located at the MAC and/or PHY layer and may not be aware about any actual service in the upper layer. The MAC layer may only know the logical channel the packet corresponds to so that a HARQ entity may be selected per Logical Channel.

In other words, embodiments of the inventive approach provide for the possibility to simultaneously, i.e., at the same time, support synchronous and asynchronous HARQ operations thereby combining the advantages of the respective operations with respect to the service from which a transmission originates. For example, synchronous HARQ has the advantage that scheduling a retransmission does not require an extra PDCCH, thereby avoiding the consumption of additional time, especially for uplink transmissions and reducing the blind decoding burden. The synchronous HARQ operation uses a dedicated HARQ indicator channel for transmitting the ACK/NACK messages, and a NACK message automatically assigns a predefined resource for the retransmission, dependent on the initial transmission, i.e., no additional time is spent for scheduling resources for the retransmission. For example, a UE may use the synchronous HARQ operation when recognizing that a transmission originates from a latency critical service, like the URLLC service, or a low-complexity service, like the mMTC service, however, at the same time, the UE may also support transmissions from delay non-critical or regular complexity services, like the eMBB service, and for such transmissions, the UE may use the PDCCH for scheduling retransmissions asynchronously. For example, when applying the synchronous HARQ operation, a Stop&Wait HARQ mechanism may be used, while the asynchronous HARQ protocol may be selected and used for delay non-critical services.

Additionally, for downlink transmissions, a HARQ protocol may be used which employ regular channel state information feedback for delay non-critical transmissions, while another HARQ protocol using low latency CSI feedback channel may be used in case of latency critical services. These CSI feedbacks may be transmitted using the PUCCH using different formats.

Figure 6:
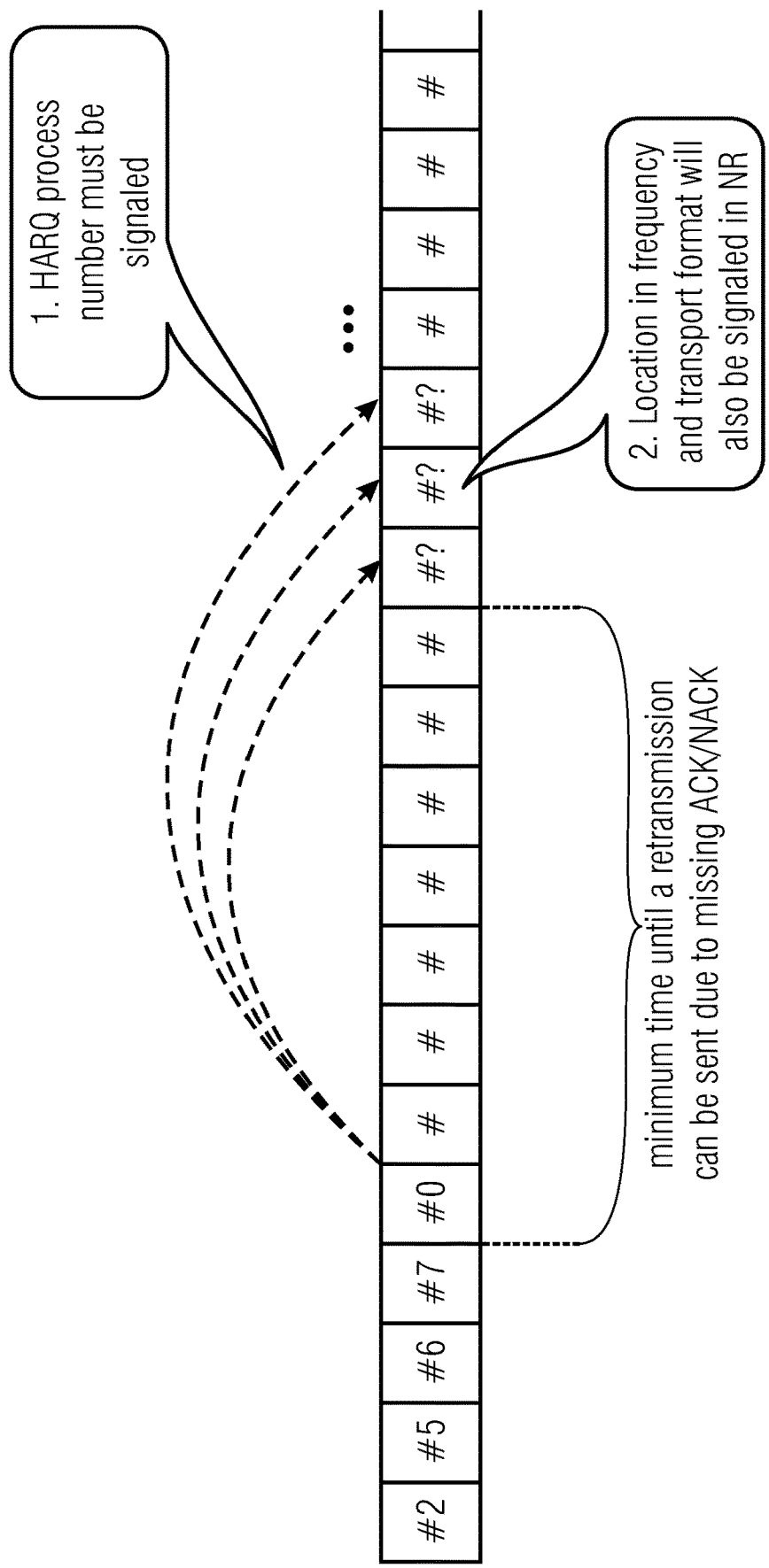
FIG. 6 illustrates an adaptive asynchronous HARQ at is may be used in NR.
Figure 7:
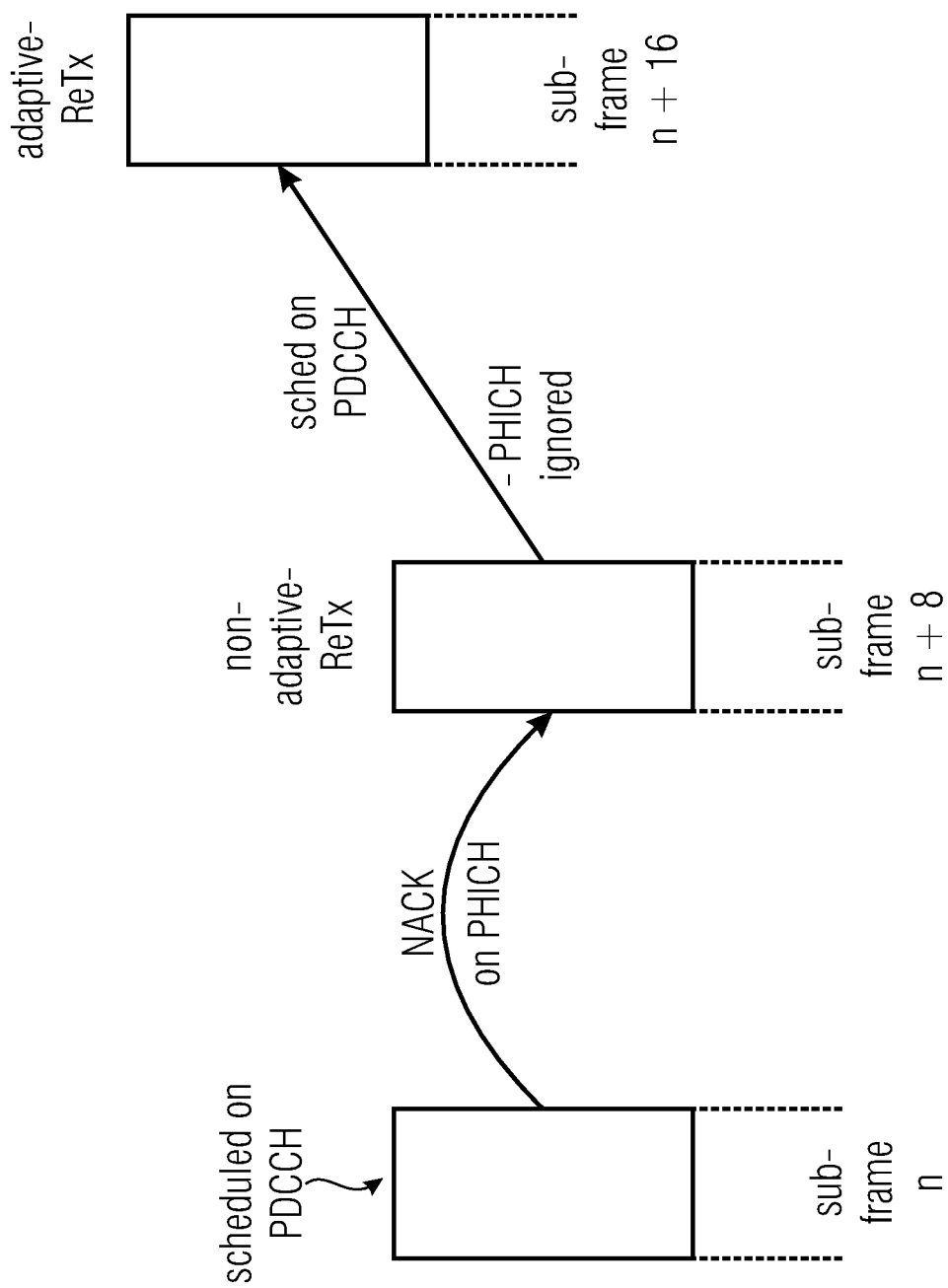
FIG. 7 illustrates schematically a synchronous HARQ process in a LTE wireless communication system using adaptive or non-adaptive transmissions/operations.
Figure 8:
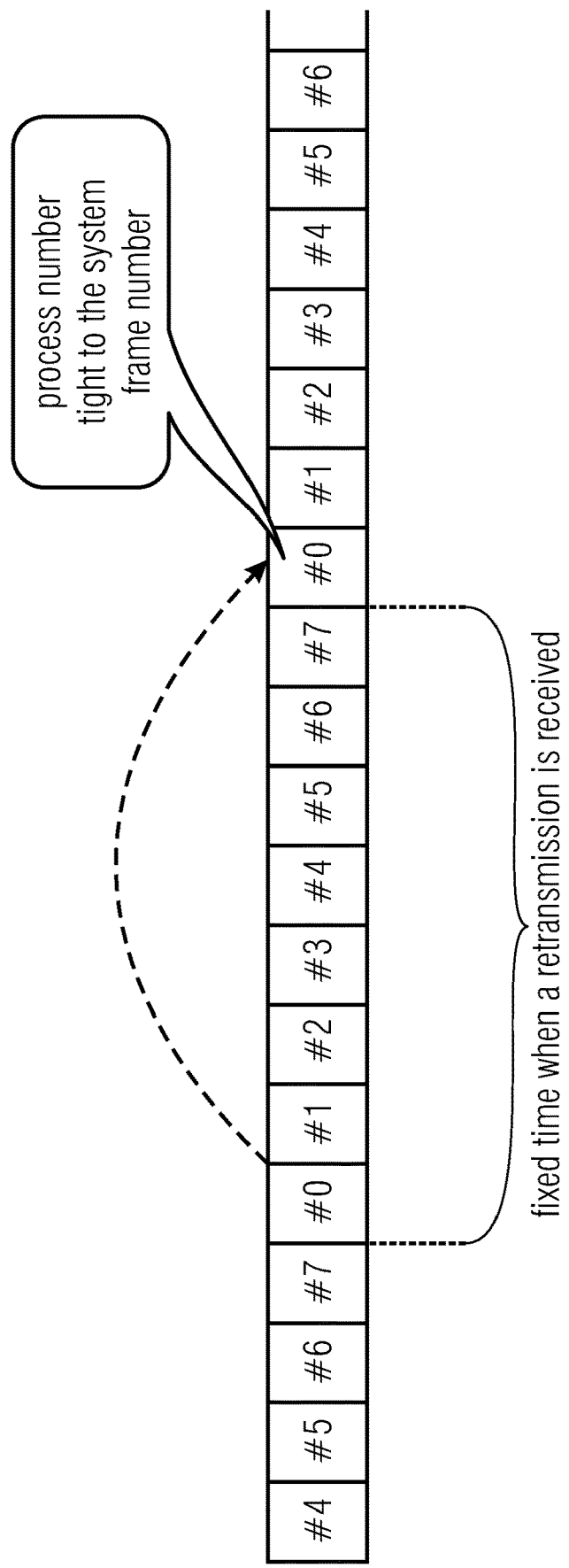
FIG. 8 illustrates non-adaptive synchronous HARQ at is may be used for ULLRC services.
Figure 11:
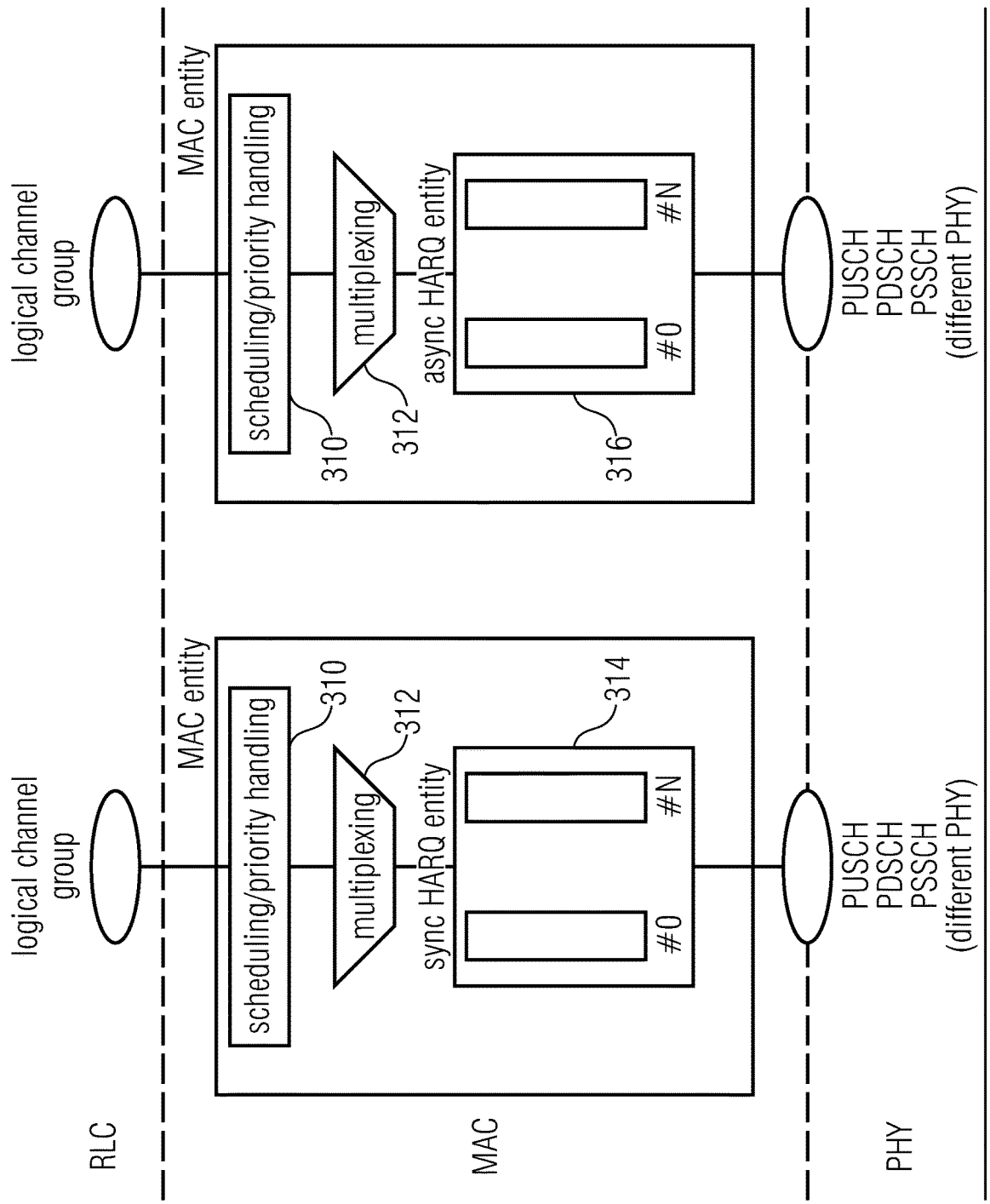
FIG. 11 illustrates a further embodiment of a layer structure for implementing synchronous and asynchronous HARQ operation at the base station or the user equipment using separate MAC entities in the MAY layer.

FIG. 6 illustrates schematically the layer 2 structure for implementing simultaneous synchronous and asynchronous HARQ operation at the base station or the user equipment in accordance with an embodiment of the present invention. At the MAC layer, a MAC entity is provided which performs the scheduling/priority handling 310 and the multiplexing 312. The MAC entity further includes a synchronous HARQ entity 314 for a synchronous HARQ operation and an asynchronous HARQ entity 316 for an asynchronous HARQ operation so that dependent on the HARQ to be used either one or both of the HARQ entities 314, 316 may be applied or used for a transmission of one or more data packets. In accordance with other embodiments, rather than providing a single MAC entity including the HARQ entities 314, 316, multiple MAC entities may be provided, each including a HARQ entity, as is shown in FIG. 11. Additionally, a single HARQ entity may also support a synchronous and asynchronous HARQ operation at the same time, shifting the HARQ processes between the HARQ operation modes dynamically or by re-/configuration, e.g., RRC signaling.

Thus, the inventive approach provides network entities and methods supporting simultaneously or at the same time different retransmission protocols or procedures. Although reference is made to two retransmission procedures it is noted that the inventive approach is not limited to such a scenario, rather, more than two retransmission procedures may be supported simultaneously at the network entity. Further, the inventive approach is not limited to asynchronous and synchronous HARQ operations, rather, other retransmission procedures, like ARQ procedures may be implemented.

In accordance with embodiments, the HARQ protocols to be used may be semi-statically configured via the RRC protocol. The configuration may set the criteria according to which the UE or gNB chooses which HARQ protocol to use, for example on the basis of the service type, like eMBB, URLLC or mMTC, or on the basis of specific 5QI attributes, like delay or guaranteed bitrate, GBR.

In accordance with further embodiments, different HARQ entities may be used for each of the supported HARQ protocols. The HARQ entities may be configured by signaling or may be hard-coded in the standard. The different HARQ entities may use different logical channels, which are defined by a logical channel identity, and may use different physical channels, which are defined by different physical resources. The different physical resources may also use different sub-carrier spacing.

The different HARQ entities may use different target Block Error Rates, BLERs, for the different transmissions/retransmissions and may be associated with a different number of HARQ processes. Moreover, a different order of the redundancy versions, RVs, may be applied.

In accordance with further embodiments, the DCI signaling may be employed for distinguishing the HARQ entities/protocols. For example, the UE needs to determine for a received grant for a transmission which HARQ entity is to processed or which HARQ protocol is to be applied. This may be accomplished either by using the Radio Network Temporary Identifier, RNTI, or a new, specific DCI format, which may be a compact format.

When using RNTI, for example, the UE is configured with a new RNTI, for example via an RRC signaling, and the new RNTI is associated with the HARQ entity/protocol to be used for a transmission so that during the blind decoding process, during which all RNTIs are tested, the UE may determine which HARQ protocol is to be applied.

The new DCI format may be used specifically for the delay critical transmissions, and since a synchronous HARQ does not require a HARQ process ID, the new DCI format may be provided which does not include a HARQ process ID. The DCI format, in case of URLLC services, may be referred to as a URLLC DCI format. A DCI format including the HARQ process ID because it relates to an asynchronous HARQ operation, e.g., for an eMBB service, may be referred to as a eMBB DCI format. In accordance with this approach, the UE may test to PDCCH candidates against its eMBB DCI formats and against the URLLC DCI format, so that the embedded checksum indicates which DCI format and, therefore, which HARQ entity/protocol, is to be applied. A DCI for signalling a DL transmission with synchronous HARQ may be referred to as a compact DCI Format 1_2 to be detected by blind decoding. The compact DCI Format 1_2 may include fields identical with DCI Format 1_0 and not include the following fields:

HARQ process number—4 bits
Downlink assignment index
PDSCH-to-HARQ_feedback timing indicator In accordance with yet further embodiments, dedicated PUCCHs may be used for each HARQ entity/protocol. For example, each HARQ/protocol may receive its dedicated PUCCH for transmitting the feedback or the LL-CSI in the uplink. This allows supporting the low latency for the URLLC HARQ protocol. Since the eMBB HARQ protocol may use bundling techniques, more processing and longer transmission times are needed, translating into a correspondingly longer PUCCH. This, however, is a bottleneck for URLLC HARQ procedures. Therefore, in accordance with the present invention, URLLC HARQ procedures uses a short PUCCH with a single ACK/NACK feedback and/or LL-CSI.

In accordance with yet further embodiments, RRC signaling may be used for configuring the number of HARQ processes and the UE capability. In NR and LTE, only a single HARQ protocol is used for the uplink and the downlink, respectively. Hence, configuring the number of HARQ processes for the PDSCH, the PUSCH and PSSCH is sufficient. In accordance with the present invention, the gNB may tell the UE how many HARQ processes are to be used for the synchronous HARQ protocol and the asynchronous HARQ protocol, see FIG. 6 above indicating at 314 and 316 the respective HARQ processes. The number of available HARQ processes for each protocol may be part of the UE capability which may be signaled to the gNB by the UE. Below an example for a signaling for the PDSCH is shown in which for the asynchronous HARQ operation, see nrof-HARQ-ProcessesForPDSCH, the number of HARQ processes for PDSCH is indicated, as well as the number of HARQ processes for PDSCH-URLLC, see nrofHARQ-ProcessesForPDSCH-URLLC.

```
PDSCH-ServingCellConfig ::= SEQUENCE {
codeBlockGroupTransmission SetupRelease {PDSCH-
    CodeBlockGroupTransmission} OPTIONAL xOverhead  ENUMERATED
    { xOh6, xOh12, xOh18 } OPTIONAL
nrofHARQ-ProcessesForPDSCH ENUMERATED {n2, n4, n6, n10, n12, n16}
    OPTIONAL
nrofHARQ-ProcessesForPDSCH-URLLC ENUMERATED {n2, n4, n6, n10,
    n12, n16} OPTIONAL
pucch-Cell ServCellIndex OPTIONAL , -- Cond SCellAddOnly ... }
```

In accordance with yet further embodiments, a DCI miss detection and rescheduling of retransmissions may be implemented. For example for downlink transmissions, the UE may miss an initial scheduling of the transmission, and in this case, naturally, also the following retransmissions are missed. The gNB may detect the missing PUCCH, namely the missing feedback or the missing LL-SCI, for example, dependent on the indicated PUSCH format. In case the gNB detects the miss of a DCI, the same transmission or the next redundancy version is rescheduled explicitly using a PDCCH at the next opportunity. The gNB, in case of a PUSH format 0-1 may perform a power thresholding so as to detect a missing PUCCH transmission, and in case of a PUCCH format 2-4, it may perform a checksum detection, wherein a mismatch in the embedded checksum indicates the missing of the initial grant.

In accordance with embodiments, a base station, gNB, may schedule a UL HARQ retransmission. For example an adaptive retransmission used, e.g., in NR, may be applied and the gNB may schedule an UL resource allocation for the retransmission using regular DCI formats on the PDCCH to indicate a new location and format. Thus, a full signaling of the HARQ control information is provided including, e.g., the process ID, the RV, the NDI.

Also an non adaptive and synchronous ARQ retransmission may be scheduled, and, in accordance with embodiments, the gNB has different options to trigger a retransmission by a UE.

In accordance with a first embodiment, a Physical Hybrid Indicator Channel, PHICH, may be used that is limited to ACK/NACKs, i.e., includes only the ACK/NACK messages. Once the UE received a NACK the UE retransmits with a fixed format on the same resource, optionally fixed to a predefined sequence of RVs. The signaling of a fast ACK is beneficial, e.g., to stop autonomous retransmissions and in URLLC scenarios retransmissions may be send without waiting for a NACK.

In accordance with a second embodiment, a PDCCH with a new Compact DCI format may be implemented so that only limited control information may be send, causing a reduced load when compared to a regular DCI format. For example, there may be no need to send the process ID because the same resources are used as for the initial transmission.

For example, for an initial transmission a regular DCI may be used with detailed information, and later, for the retransmissions or for an initial transmission of new data only the compact DCI format is used, e.g., when using a synchronous protocol.

Further, the gNB may request a new initial uplink transmission from the UE if no UL ACK/NACK on the first transmission is received, i.e., no ACK, or no NACK or nothing was received. Alternatively the gNB may request a specific redundancy version with compact DCI.

Figure 12:
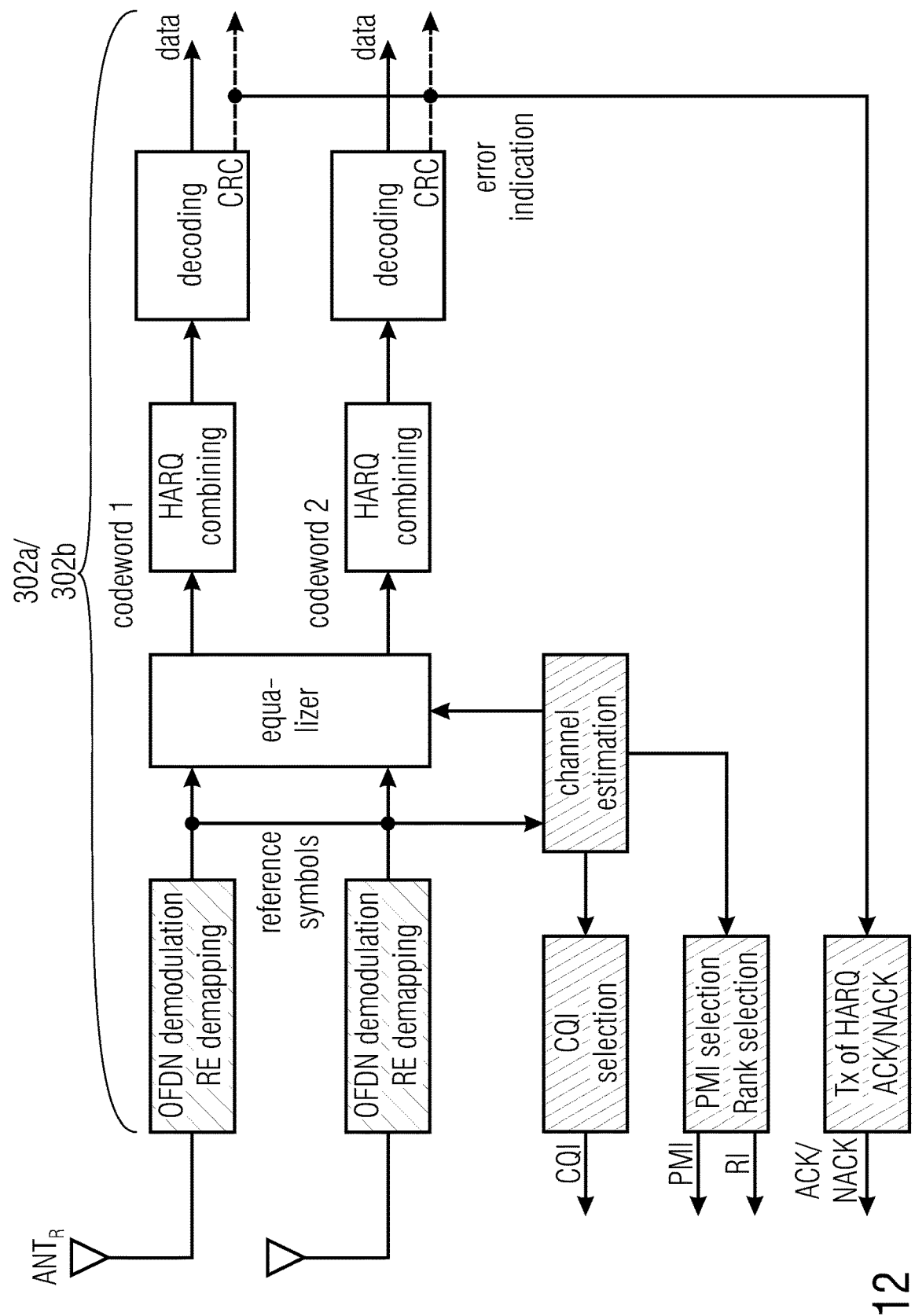
FIG. 12 illustrates details of a UE, like a UE as described above with reference to FIG. 9 including the antennas $ANT_R$, the signal processor 302a and the transceiver 302b.

Further embodiments for a feedback, like UE feedback for a DL HARQ Retransmission, are now described. FIG. 12 illustrates details of a UE, like a UE as described above with reference to FIG. 9 including the antennas $ANT_R$, the signal processor 302a and the transceiver 302b. As is illustrated in FIG. 12 following the receipt of a transmission, initially, using the reference signals in the transmission, a channel estimation may be made so as to generate a CQI. Also further PMI and RI may be provided. The ACK/NACK message is created only once the data has been processed to see whether decoding is successful or not.

Embodiments may provide for a synchronous HARQ a low latency, LL, PUCCH that is send more frequently than a regular PUCCH, e.g., using a smaller transmission time interval. The LL-PUCCH may not support HARQ ACK/NACK bundling as this involves waiting for the receipt and decoding processing of a plurality of data packets. The LL-PUCCH enables the sending of HARQ ACK/NACKs immediately, they may even overtake HARQ ACK/NACKs of an asynchronous HARQ protocol as conventionally ACK/NACK have to be send in a FIFO, first in first out, sequence.

Asynchronous HARQ uses the regular PUCCH, and embodiments of the invention allow to multiplex the feedback into a regular PUSCH. If latency is not critical the multiplexing into the PUSCH is beneficial, e.g., a better link adaptation is possible, since PRBs are scheduled, a larger payload is provided, and the like.

Figure 13:
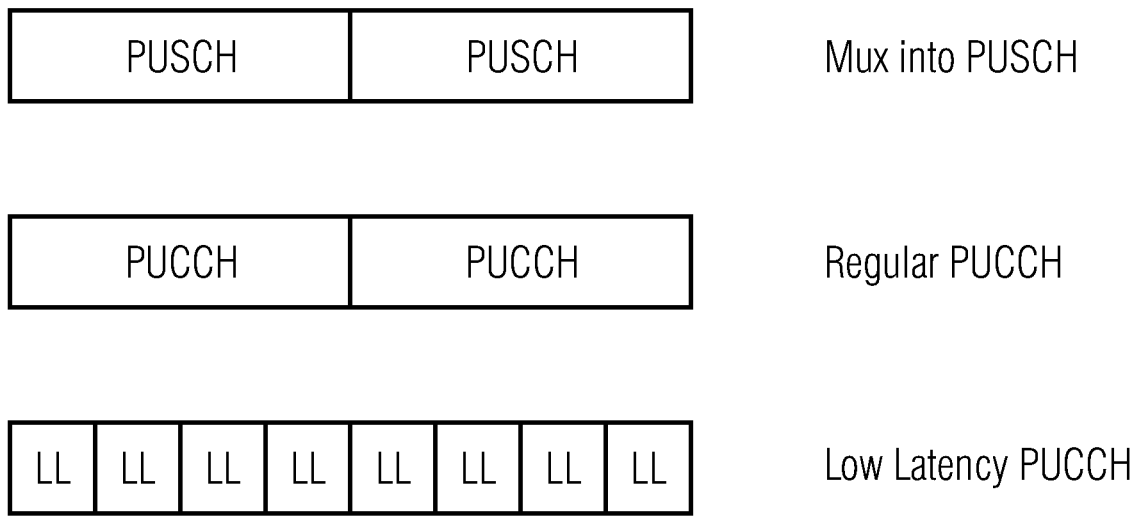
FIG. 13 illustrates the above concept of using for the feedback LL-PUCCHs in case of synchronous HARQ, and multiplexing the feedback into the regular PUCCH in case of asynchronous HARQ.

FIG. 13 illustrates the above concept of using for the feedback LL-PUCCHs in case of synchronous HARQ, and multiplexing the feedback into the regular PUCCH in case of asynchronous HARQ.

According to further embodiments, the LL-PUCCH may be employed for transmitting a low latency, LL, CSI, e.g., to support RV selection and adaptive retransmission in case for the initial transmission the channel situation, e.g. estimated by using DM-RS, was not ok, as well as a low latency, LL, HARQ, e.g., to provide faster ACK/NACK compared to slower eMBB decoding. For example, first, a LL-PUCCH is send with a fast CSI feedback based on frontloaded DM-RS of the initial transmission which is faster since it is based on a channel estimation and not on the decoding of the packet. If a fast CSI feedback is not received a new initial transmission may be send, e.g., in case the PDCCH resource allocation and therefore DM-RS are not received. The LL-CSI feedback may be interpreted or understood as an ACK for the PDCCH+DM-RS and/or the data itself. Following the LL-CSI feedback, a LL-PUCCH with the ACK/NACK may be send. The feedback may be combined with one or more additional or incremental CSI feedback, and may use the same or a different PUCCH format as the fast CSI feedback.

In some of the embodiments described above, reference has been made to respective vehicles being either in the connected mode, also referred to as mode 3 configuration, or vehicles being in the idle mode, also referred to as mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also in such scenarios, scheduling the resources in accordance with the aspects described above is advantageous as it allows for a more efficient scheduling of resources for sidelink communication avoiding resource collisions and the like.

Some embodiments of the present invention have been described above with reference to a communication system in which the transmitter is a base station serving a user equipment, and in which the receiver is the user equipment served by the base station. However, the present invention is not limited to such embodiments and may also be implemented in a communication system in which the transmitter is a user equipment station, and in which the receiver is the base station serving the user equipment. In accordance with other embodiments, the receiver and the transmitter may both be UEs communicating directly with each other, e.g., via a sidelink interface.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 14 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS

V2X Vehicle-to-Everything
3GPP Third Generation Partnership Project
D2D Device-to-Device
BS Base Station
eNB Evolved Node B (3G base station)
UE User Equipment
NR New Radio

REFERENCES

[1] RP-180889, Views on NR URLLC work in Rel-16, Huawei, HiSilicon
[2] RP-181477, SID on Physical Layer Enhancements for NR URLLC, Huawei, HiSilicon, Nokia, Nokia Shanghai Bell

The invention claimed is:

1. An apparatus comprising: a processor circuit and a memory circuit, wherein the memory is arranged to store instructions for the processor circuit, wherein the processor circuit is arranged to receive at least one data packets wherein the processor circuit is arranged to request a retransmission of a data packet when there is a non-successful transmission of the data packet, wherein the processor circuit is arranged to perform a first HARQ operation associated with a first HARQ entity, wherein the processor circuit is arranged to perform a second HARQ operation associated with a second HARQ entity, wherein the first HARQ operation is different from the second HARQ operation, wherein a first HARQ entity is associated with a first logical channel and a second HARQ entity is associated with a second logical channel, wherein the first logical channel is different from the second logical channel, wherein the processor circuit is arranged to select and/or apply for a received resource assignment on the PDCCH control channel one of the first HARQ entity or the second HARQ entity based on at least one Radio Network Temporary Identifier, wherein the processor circuit is arranged to receive a configuration message when using the at least one Radio Network Temporary Identifier, wherein the configuration message causes the apparatus to be configured with a new Radio Network Temporary Identifier, wherein the processor circuit is arranged to apply a blind decoding process, wherein the blind decoding process tests all Radio Network Temporary Identifiers, wherein the processor circuit is arranged to determine which of the first HARQ entity or the second HARQ entity to select based on the blind decoding process.

2. The apparatus of claim 1, wherein the processor circuit is arranged to apply to the at least one data packet the first HARQ operation, or the second HARQ operation, or the first and second HARQ operations simultaneously in response to a to a signaling or based on an association between a logical channel the at least one data packets belongs to and the HARQ entity.

3. The apparatus of claim 2, wherein the first HARQ operation and the second HARQ operation comprise at least one of a Stop-and-Wait ARQ protocol, a window based ARQ protocol, a synchronous protocol, an asynchronous protocol, wherein the synchronous protocol schedules the retransmission and/or at least one HARQ ACK/NACK at pre-defined time instances after the initial transmission, wherein the asynchronous protocol schedules the retransmission and/or the at least one HARQ ACK/NACK dynamically.

4. The apparatus of claim 1, wherein the processor circuit is arranged to process first data packets of the first logical channel and second data packets of the second logical channel, wherein the at least one data packet comprise the first data packets and the second data packets.

5. The apparatus of claim 1,
wherein the first data packets comprises:
a data packet provided by a delay critical service of the wireless communication system;
a data packet associated with a first Quality of Service; and
a data packet associated with a first guaranteed bit rate
wherein the second data packets comprises:
a data packet provided by a delay non-critical service of the wireless communication system;
a data packet associated with a second QoS; and
a data packet having associated with a second GBR,
wherein the first QoS is higher than the second QoS,
wherein the first GBR is higher than the second GBR.

6. The apparatus of claim 2,
wherein the processor circuit is arranged with a preconfiguration of the first HARQ operation and the second HARQ operation, or, wherein the processor circuit is with a preconfiguration of at least two HARQ operations having different settings,
wherein the different settings are configurable in response to the signaling or based on the association.

7. The apparatus of claim 6,
wherein the processor circuit is arranged to receive a configuration message,
wherein the processor circuit is arranged to configure the settings in response to the configuration message.

8. The apparatus of claim 7,
wherein the processor circuit is arranged to receive the configuration message from a base station,
wherein the processor circuit is arranged to decode the configuration message,
wherein the processor circuit is arranged to configure a MAC Layer and/or a Physical Layer.

9. The apparatus of claim 1, wherein the processor circuit is preconfigured according to configuration specified in a standard.

10. The apparatus of claim 1, wherein the processor circuit is arranged to support at least two HARQ processes, HARQ processes supporting a different number of data packets, at least two redundancy versions, at least two sequences of redundancy versions, different channels for ACK/NACK reporting, different ACK/NACK timings, a maximum number of HARQ retransmissions, different aggregation factors for bundling transmissions of a data packet, different target Block Error Rates, and BLERs.

11. The apparatus of claim 10, wherein processor circuit is arranged to maintain at least one parallel HARQ process, each HARQ process of the at least one HARQ processes is associated with a HARQ process identifier, wherein the HARQ process identifier may either be selected autonomously out of a pool of HARQ processes, or predefined by a sequence number or dynamically selected by a first device.

12. The apparatus of claim 1, wherein the first and second HARQ entities are semi-statically configured and/or associated to different logical channels.

13. The apparatus of claim 1, wherein the processor circuit is arranged at a MAC layer, wherein the processor circuit is associated and/or linked and/or mapped to at least one Physical Layer procedures or Physical Layer channels wherein the at least one Physical Layer procedures or Physical Layer channels are selected from the group consisting of different downlink resource allocation methods, DCI formats for downlink, uplink and sidelink scheduling via the PDCCH on the PHY, RNTIs indicated in the Das for scheduling via the PDCCH on the PHY, downlink control channels to request uplink retransmission, physical channels for data transmission, uplink grant methods, uplink control channels to request downlink retransmission.

14. The apparatus of claim 1,
wherein the processor circuit is arranged at a MAC layer,
wherein the processor circuit is arranged to provide downlink control information or uplink control information to a physical layer,
wherein the processor circuit is arranged to provide control information bits in the Downlink Control Information,
wherein the processor circuit is arranged to provide control information bits in the Uplink Control Information.

15. The apparatus of claim 1, wherein the DCI format comprises a first DCI format and a second DCI format, wherein the first DCI format signals associated HARQ control information, wherein the second DCI format that does not signal all HARQ control information, wherein the non-signaled HARQ control information is derived by the apparatus, wherein the first DCI may be used for an initial transmission, wherein the second DCI format may be used for the at least one retransmission, wherein the processor circuit is arranged to evaluate an embedded checksum so as to identify which one of the first DCI format and the second DCI format has been received, wherein the processor circuit is arranged to select one of the first HARQ operation and the second HARQ operation based on the identification.

16. The apparatus of claim 1,
wherein processor circuit is arranged at a MAC layer,
wherein the processor circuit is arranged to send ACK/NACK control information to a Physical Layer for transmission on a dedicated control channel.

17. The apparatus of claim 16,
wherein the control channel comprises a PHICH,
wherein the PHICH is arranged to transmit only ACK/NACK messages.

18. The apparatus of claim 17, wherein the processor circuit is arranged to perform the retransmission with a fixed format on same resource used by the preceding transmission,
wherein a predefined sequence of redundancy versions are used.

19. The apparatus of claim 16, wherein the control channel comprises a low latency PUCCH, wherein the low latency PUCCH comprises an ACK/NACK message, wherein the low latency PUCCH sends messages send more frequently than a regular PUCCH and/or the low latency PUCCH carrying a smaller payload than a regular PUCCH.

20. The apparatus of claim 19,
wherein the processor circuit is arranged to estimate a radio channel ins response to receiving the data packet prior to processing the data packet based on Demodulation Reference Symbols, DM-RS, over which the data packet is transmitted,
wherein a resource allocation of the data packet provides a CSI,
wherein the processor circuit is arranged to include the CSI into a low latency PUCCH or transmit the CSI using a first low latency PUCCH and ahead of the ACK/NACK message.

21. The apparatus of claim 1,
wherein the processor circuit is arranged to detect a missing PUCCH for a HARQ ACK/NACK,
wherein the processor circuit is arranged to reschedule the same transmission or the initial transmission or the next redundancy version in response to the missing PUCCH for the HARQ ACK/NACK.

22. The apparatus of claim 21,
wherein the processor circuit is arranged to perform a power thresholding to detect a missing PUCCH transmission when a PUCCH format 0-1 occurs,
wherein the processor circuit is arranged to perform a checksum detection when a PUCCH format 2-41 occurs,
wherein a mismatch in the embedded checksum indicates a missing of an initial grant.

23. The apparatus of claim 1,
wherein the processor circuit is arranged to signal capabilities,
wherein the capabilities are selected from the group consisting of of supported HARQ entities, available HARQ processes, available HARQ soft buffer, supported DCI formats, supported physical channels, if a low latency PUCCH is supported.

24. A method comprising: receiving at least one data packets; requesting a retransmission of a data packet when there is a non-successful transmission of the data packet, wherein the retransmission comprises: providing a first HARQ operation and a second HARQ operation, wherein the first HARQ operation is different from the second HARQ operation; performing the first HARQ operation; and performing the second HARQ operation, wherein a first HARQ entity is associated with a first logical channel and a second HARQ entity is associated with a second logical channel, wherein the first logical channel is different from the second logical channel; selecting and/or applying for a received resource assignment on the PDCCH control channel one of the first HARQ entity and the second HARQ entity based on at least one specific Radio Network Temporary Identifier wherein the processor circuit is arranged to receive a configuration message when using the at least one Radio Network Temporary Identifier, wherein the configuration message causes the apparatus to be configured with a new Radio Network Temporary Identifier, wherein the processor circuit is arranged to apply a blind decoding process, wherein the blind decoding process tests all Radio Network Temporary identifiers, wherein the processor circuit is arranged to determine which of the first HARQ entity or the second HARQ entity to select based on the blind decoding process.

25. A computer program stored on a non-transitory medium, wherein the computer program when executed on a processor performs the method as claimed in claim 24.

* * * * *